US011280933B2

(12) United States Patent
Guglielmo et al.

(10) Patent No.: US 11,280,933 B2
(45) Date of Patent: *Mar. 22, 2022

(54) SYSTEMS AND METHODS FOR COLLECTING, DISPLAYING, ANALYZING, RECORDING, AND TRANSMITTING FLUID HYDROCARBON PRODUCTION MONITORING AND CONTROL DATA

(71) Applicant: FW Murphy Production Controls, LLC, Tulsa, OK (US)

(72) Inventors: Kennon Guglielmo, San Antonio, TX (US); Frank Murphy, Tulsa, OK (US)

(73) Assignee: FW Murphy Production Controls, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/866,666

(22) Filed: May 5, 2020

(65) Prior Publication Data
US 2020/0326454 A1    Oct. 15, 2020

Related U.S. Application Data

(63) Continuation of application No. 16/031,774, filed on Jul. 10, 2018, now Pat. No. 10,962,678, which is a
(Continued)

(51) Int. Cl.
*G01V 11/00*    (2006.01)
*G05B 19/042*    (2006.01)

(52) U.S. Cl.
CPC .......... *G01V 11/002* (2013.01); *G05B 19/042* (2013.01); *G05B 19/0428* (2013.01);
(Continued)

(58) Field of Classification Search
None
See application file for complete search history.

(56) References Cited

U.S. PATENT DOCUMENTS 6,680,675 B1 * 1/2004 Suzuki .................. G01C 21/34
340/539.13
7,080,544 B2 * 7/2006 Stepanik ................ G08B 21/12
702/22

(Continued)

FOREIGN PATENT DOCUMENTS

CN    206128702 U  *  4/2017

*Primary Examiner* — Fekadeselassie Girma
(74) *Attorney, Agent, or Firm* — William H. Quirk; Alexander Antonio; Rosenthal Pauerstein Sandoloski Agather, LLP

(57) ABSTRACT

Systems and methods for enabling an augmented reality device to easily collect, analyze, transmit, and act on wireless information transmitted from various instruments on hydrocarbon production and pipeline skids. The augmented reality device preferentially presents and records available data streams from the various instruments on the hydrocarbon production and pipeline skids in an augmented reality user interface. The augmented reality user interface preferentially presents such data streams as readings from the various instruments in an easy-to-read, color-coded display, wherein the color coding relates to various in-tolerance and out-of-tolerance ranges related to each of the various instruments.

20 Claims, 13 Drawing Sheets
(1 of 13 Drawing Sheet(s) Filed in Color)

Related U.S. Application Data continuation-in-part of application No. 15/069,937, filed on Mar. 14, 2016, now Pat. No. 10,021,466, which is a continuation-in-part of application No. 14/091,323, filed on Nov. 26, 2013, now Pat. No. 9,285,503, which is a continuation of application No. 13/078,755, filed on Apr. 1, 2011, now Pat. No. 8,594,938.

(60) Provisional application No. 61/320,210, filed on Apr. 1, 2010.

(52) U.S. Cl.
CPC ............ *G05B 2219/1146* (2013.01); *G05B 2219/15117* (2013.01); *G05B 2219/23161* (2013.01); *G05B 2219/23406* (2013.01); *G05B 2219/24001* (2013.01); *G05B 2219/25062* (2013.01); *G05B 2219/32014* (2013.01)

(56) References Cited

U.S. PATENT DOCUMENTS

| | | | | |
|---|---|---|---|---|
| 7,302,313 B2* | 11/2007 | Sharp | .................. | G01N 1/26 700/275 |
| 7,330,112 B1* | 2/2008 | Emigh | .................. | G06Q 10/00 340/539.13 |
| 7,787,992 B2* | 8/2010 | Pretlove | .................. | G06F 3/011 700/259 |
| 9,285,503 B2* | 3/2016 | Guglielmo | .......... | G01V 11/002 |
| 2005/0035876 A1* | 2/2005 | Hall | .................. | E21B 47/12 340/854.1 |
| 2005/0124319 A1* | 6/2005 | Williams | .................. | H04L 63/10 455/411 |
| 2005/0144321 A1* | 6/2005 | Forsberg | .......... | H04L 29/06027 709/245 |
| 2005/0200480 A1* | 9/2005 | Caras | .................. | G08B 25/003 340/539.22 |
| 2006/0241792 A1* | 10/2006 | Pretlove | .................. | G06Q 50/00 700/83 |
| 2007/0032246 A1* | 2/2007 | Feher | .................. | A61B 5/0022 455/456.1 |
| 2007/0143297 A1* | 6/2007 | Recio | .................. | G06F 16/9537 |
| 2008/0146344 A1* | 6/2008 | Rowe | .................. | G07F 17/3288 463/42 |
| 2008/0319666 A1* | 12/2008 | Petrov | .................. | G01C 21/005 701/469 |
| 2009/0096637 A1* | 4/2009 | Olson | .................. | H04L 67/12 340/993 |
| 2009/0224906 A1* | 9/2009 | Balgard | .............. | H04L 41/0809 340/539.1 |
| 2009/0292470 A1* | 11/2009 | Curry | .................. | G01W 1/14 702/3 |
| 2010/0295673 A1* | 11/2010 | Ahmad | .................. | H04L 67/125 340/539.1 |
| 2011/0234399 A1* | 9/2011 | Yan | .................. | H04W 4/70 340/539.32 |
| 2011/0306400 A1* | 12/2011 | Nguyen | .............. | G07F 17/3223 463/20 |
| 2012/0029759 A1* | 2/2012 | Suh | .................. | G07C 5/006 701/29.4 |
| 2012/0227608 A1* | 9/2012 | Givens | .................. | F42B 3/10 102/311 |
| 2012/0318500 A1* | 12/2012 | Urbancic | .............. | G01V 1/288 166/250.1 |
| 2013/0317944 A1* | 11/2013 | Huang | .............. | G06Q 30/0623 705/26.61 |

* cited by examiner

SYSTEMS AND METHODS FOR COLLECTING, DISPLAYING, ANALYZING, RECORDING, AND TRANSMITTING FLUID HYDROCARBON PRODUCTION MONITORING AND CONTROL DATA

CLAIM OF PRIORITY TO PRIOR APPLICATIONS

This application is a continuation of prior filed co-pending U.S. Non-Provisional application Ser. No. 16/031,774, filed on Jul. 10, 2018, entitled "Systems and Methods for Collecting, Displaying, Analyzing, Recording, and Transmitting Fluid Hydrocarbon Production Monitoring and Control Data," which is a continuation-in-part and claims the benefit of prior filed U.S. Non-Provisional patent application Ser. No. 15/069,937, filed on Mar. 14, 2016, entitled "Systems and Methods for Collecting, Analyzing, Recording and Transmitting Fluid Hydrocarbon Production Monitoring and Control Data," which issued as U.S. Pat. No. 10,021,466 on Jul. 10, 2018, and which is a continuation-in-part of prior filed U.S. Non-Provisional patent application Ser. No. 14/091,323, filed on Nov. 26, 2013, entitled "Systems and Methods for Collecting, Analyzing, Recording and Transmitting Fluid Hydrocarbon Production Monitoring and Control Data," which issued as U.S. Pat. No. 9,285,503 on Mar. 15, 2016 and which is a continuation-in-part of U.S. Non-Provisional patent application Ser. No. 13/078,755, filed on Apr. 1, 2011, entitled "Systems and Methods for Collecting, Analyzing, Recording and Transmitting Fluid Hydrocarbon Production Monitoring and Control Data", which issued as U.S. Pat. No. 8,594,938 on Nov. 26, 2013, which claims the benefit of U.S. Provisional Application Ser. No. 61/320,210, filed on Apr. 1, 2010, entitled "Systems and Method for Collecting, Analyzing, Recording, and Transmitting Fluid Hydrocarbon Production Monitoring and Control Data" (collectively, the "Prior Applications"). The entire disclosures of each of the Prior Applications listed herein are hereby incorporated by reference in their entirety into the present disclosure.

BACKGROUND OF THE INVENTION

Field of the Invention

The present invention relates generally to systems and methods for collecting, analyzing, transmitting, and acting on information collected from instruments monitoring and controlling equipment used for fluid hydrocarbon (principally natural gas) well production including collection platforms, pipeline insertion platforms, and the like.

Background Information

Where natural gas and other fluid hydrocarbons are found in the earth, producers may drill multiple boreholes (wells) in the earth to capture the hydrocarbon products. Producers often aggregate the output from individual wells by routing pipes from nearby individual wells to a common location for connection to a distribution pipeline. The collection of valves, gauges, pumps, filters, and other equipment at the common location are often attached to a rectangular metal structure. The structure, with the attached equipment, is sometimes referred to as a "platform" or "skid." Another aggregation of fluid hydrocarbon production equipment is a pipeline insertion platform. In this application, the term "skid" is meant to refer to a wide variety of equipment aggregations for fluid hydrocarbon production, conveyance and/or storage, whenever hydrocarbon conditions are being monitored by multiple instruments on a common structure, including a collection platform, a pipeline insertion platform, and the like.

Typically, producers monitor and control several different characteristics of production including pipeline pressure, instantaneous flow rate, accumulated flow, etc., and control pressures and flows to meet business and safety needs. In current practices, producers often use discrete analog pressure gauges, analog flow meters, and digital flow meters to display key information. Many of these discrete instruments lack any wireless communication or telemetry capability. Without such telemetry, a person monitoring the instruments typically has to visually inspect—i.e., "read"—each instrument's display to determine the state of the condition the instrument is monitoring to get a "reading." To make the data readings available for others' uses, the person then records each instrument's reading, often by handwriting multiple instruments' readings on a paper form. Subsequently, a data entry person may transfer the handwritten information from the paper report into a computer database.

Problems with Current Practices

Current practices have a number of limitations which increase the cost and decrease the completeness, accuracy, and usefulness of fluid hydrocarbon production monitoring and control data gathered from the skids.

First, when the skid instrument's data is captured by a person visually inspecting the instrument, that person must locate, identify, and read the instrument, and then record the reading. That can work when all goes smoothly, but problems can arise if they misread the instrument, inadvertently skip one or more instruments, or if they are unable to read the instrument because its indicator is visually obscured by rain, snow, ice, dust, or the like. Moreover, even if the person reads all the instruments correctly, they might write down the wrong reading, make an illegible entry, misattribute the reading to a different instrument, damage the paper form, or simply fail to record the reading. When the readings on the paper form are entered into a computer database, other errors may arise. For example, the data value may be entered incorrectly, misattributed, or omitted.

Second, human visual inspection, recording, and transcription lack immediate feedback for many data collection and entry errors. The person reading the instrument may not know whether the reading is within a normal range, is indicating an undesired condition, or is indicating a failed instrument that needs to be reset, repaired, or replaced. If a reader fails to read a particular instrument, the reader may not detect the omission until after leaving the site. Similarly, when recording a reading, a reader may not recognize that he has incorrectly attributed a reading from instrument A to instrument B.

Third, instruments can be costly to install or replace. A hard-wired instrument is usually attached to the sensing or controlling point but might require a separate display to indicate the instrument's reading, with wires or wireless links connecting the instrument to the display. The connections and discrete display can add significant costs. For example, a hard-wired instrument might have an average installed cost of around $1,000.

Fourth, training people to know about the instruments, what they monitor, what their normal ranges are, where they are located on the skid and other factors requires a lot of time, money, and instruction.

As explained above, current data collection and recording practices not only reduce data accuracy and completeness and increase data acquisition costs, they also undermine the processes for which the data is being collected. Production managers make production, maintenance, and safety decisions based on reported data. Inaccurate data collection and recording or delayed analysis and transmittal may increase costs and reduce profits. In the extreme, such problems may cause damage to the environment or even loss of life.

Recent Technologies and Limitations

Various modern technologies have long been available to help manage the foregoing data collection and recording problems in this field of art, but even the best of modern solutions still have their weaknesses. As one way to help manage such problems, various skid instruments are increasingly equipped with hard-wired or wireless data transmitters with which they communicate with a central control panel on the skid. Modern handheld computing devices also include features such as short- and long-range wireless communication systems, a digital camera, a geographical position fixing system such as a global navigation satellite system with single meter accuracy, and storage for applications, images, and data. Modern instrument systems also offer "bolt-on" instruments that can wirelessly communicate their readings and do not require a separate, remote display. These self-contained instruments may be bolted onto a pipe or manifold which they are to sense. Some bolt-on instruments contain an internal battery that enables the instrument to transmit its data wirelessly to a central control panel or other data collection device or system. These and other technologies can be adapted for use in gas production monitoring and control systems and methods.

Desirable Improvements

There are many improvements in data collection, analysis, recording, and transmitting systems and methods that gas producers would welcome. For example, as a partial list of desirable improvements, producers want to:
1. spend less time monitoring, collecting, evaluating and entering the data,
2. reduce the cost of monitoring, collecting, evaluating and recording the data,
3. increase the accuracy and completeness of the data,
4. decrease the time required to respond to out-of-tolerance readings,
5. reduce wasted resources and lost profits caused by data errors,
6. reduce the risk of harm to the environment and personnel, and
7. reduce the level of training and skill necessary in monitoring, collecting, evaluating, interpreting, and entering the data.

Further, it is highly desirable that any systems or methods that accomplish these improvements support skids with both wireless-enabled and non-wireless-enabled instruments.

The present invention includes systems and methods that reduce or eliminate many of the problems with the current practices, provide the desired improvements, and permit future expansions and adaptations.

SUMMARY OF THE INVENTION

The present invention includes systems and methods for collecting, analyzing, transmitting, and acting on information collected from instruments monitoring and controlling equipment used for natural gas well production collection and pipeline insertion platforms (skids).

One of the embodiments of the present invention includes an augmented reality visualization system based on handheld or wearable augmented reality displays and computing devices (HOWARDACD).

In one or more of the embodiments, the HOWARDACD has one or more wired and wireless communication systems for short-range and long-range communications. For purposes of this application, we define three separate terms of convenience pertaining to communication systems: short-range wireless communication systems, short-range wired communication systems, and long-range wireless communication systems.

Short-range wireless communication systems are systems that the HOWARDACD uses to communicate with other wireless systems that are generally not more than 100 meters away from the HOWARDACD without using a direct electrical connection between the HOWARDACD and the other system. Such short-range communication systems include commercially available technologies such as Bluetooth®, infrared, and other communication systems that have a typical maximum range up to 100 meters.

Short-range wired communication systems are those the HOWARDACD uses to communicate with other systems using a direct electrical connection. Short-range wired communication systems include one or more USB ports and the devices that connect to them including USB-to-USB cables, flash drives, floppy disks, external hard disks, and the like; hard-wired docking connections; and one or more Ethernet ports for local area network and Internet access, and the like.

Long-range wireless communication systems are systems the HOWARDACD uses to communicate with other systems that are generally more than 100 meters away from the HOWARDACD without using a direct electrical connection. Such long-range communication systems include modern cellular telephone systems, and other radio frequency (RF) communication systems such as High Frequency (HF) radio systems.

Further, this application uses the term "instrument" as a generic descriptor for a category of devices that monitor or control gas production equipment. When used herein as a generic descriptor, instrument includes an individual device (such as a sensor, flow meter, pressure gauge, or the like), multiple discrete devices (like those just listed), and data aggregating devices (such as one or more data stations or control panels). A data station or control panel, as further described below, receives data from at least one instrument. When the data station or control panel receives data from more than one instrument, the station or panel may also include some aggregation and storage of instrument data.

Another feature of one or more embodiments is a geographical position fixing system such as a global navigation satellite system (GNSS) embedded in or connected to the HOWARDACD. The GNSS feature may use the NAVSTAR Global Positioning System (GPS) or another commercially available GNSS. This application uses the term GPS to include the NAVSTAR Global Positioning System and all other GNSSs.

Another feature of the HOWARDACD is a camera and display device. The camera can view the skid and display the real-life view with other information superimposed—the Augmented Reality User Interface ("ARUI"). In the preferred embodiment, the person assigned to collect data from a skid—the "reader"—wears augmented reality glasses that superimposes the helpful information of the ARUI to the reader. Such information could include directions and visual cues to the location of the skid and various instruments on the skid, control panels and readouts of various instruments, normal ranges, caution ranges, and danger ranges of various instruments. In some implementations, the HOWARDACD displays the ARUI superimposed over "reality" by including the UI elements onto glasses. In other versions, the reader uses a handheld device that uses a camera to show the scene with the helpful ARUI information superimposed.

The systems and methods of the present invention help reduce the costs, errors, inefficiencies, and limitations of the current practices even for skids without any wireless-enabled instruments. However, gas producers can achieve greater savings and efficiencies using skids that are partially or fully equipped with wireless-enabled instruments. Furthermore, the HOWARDACD with an ARUI allows for quicker and more accurate training of personnel as their data gathering and monitoring is guided by the intelligence of the ARUI.

When collecting data from a skid, the reader tasked with collecting the data often must drive to the skid's location. In the preferred embodiment the ARUI and the HOWARDACD can help the reader drive to the area where the skid is located by showing directions in a head's up display. If there is more than one skid in the area, the HOWARDACD can help the reader identify the specific skid or skids from which to collect data by comparing the skid's location, stored in an application in the HOWARDACD, with the reader's location as determined by the GNSS. Optionally, the reader can use the HOWARDACD to view a stored photograph of the skid for further confirmation of the skid's identity.

Once the reader positively identifies the proper skid, the reader selects the skid in the HOWARDACD, and the HOWARDACD displays a list of instruments from which the reader may gather readings. In one embodiment, the ARUI will highlight the skid and the various instruments with different colors. When the ARUI receives and records data from the particular instrument, the color changes or the instrument highlight is shaded in using the augmented reality features of the HOWARDACD to indicate that the HOWARDACD has recorded the data. In another embodiment, the HOWARDACD displays the instrument readings and or control panel automatically to the reader when glancing or looking at the particular instrument section of the skid.

In some embodiments, the HOWARDACD uses wireless or visual tags to identify the specific skid and which information and instruments are on the skid. Some examples of such wireless or visual tags include RFID tags, QR tags, UPC Codes, specific or other visual indicators. In these embodiments, the HOWARDACD camera recognizes the tag and connects wirelessly to then receive and display the data. In other embodiments, the HOWARDACD includes enough software intelligence to recognize the skid and the instruments by the visuals alone.

In other embodiments, as the reader approaches the identified skid, the HOWARDACD detects wireless signals from one or more remote transceivers linked with the instruments associated with the skid. Preferably, the HOWARDACD can simultaneously detect signals from all of the remote transceivers linked to each of the instruments associated with a particular skid. The closer the proximity of the HOWARDACD to a particular remote transceiver, the stronger the signal that is detected. As the reader approaches a particular instrument on the skid, the strength of the associated remote transceiver's signal detected by the HOWARDACD increases based on the HOWARDACD's proximity to the particular remote transceiver. The HOWARDACD can indicate the strength of the proximity by tactile feedback in the HOWARDACD. For example, the HOWARDACD may generate stronger vibrations as the reader gets closer to the instrument in question. In other words, the strongest signal detected by the HOWARDACD corresponds to the remote transceiver closest to the HOWARDACD. Once the reader has approached the linked instrument, either automatically or with reader permission, the HOWARDACD may then wirelessly interrogate or receive the data signal to obtain a reading from the particular instrument. Preferred systems may utilize the M2 Wireless™ Monitoring System commercially available from FW Murphy Production Controls, LLC of Tulsa, Okla. [www.fwmurphy.com].

Alternatively, as the reader approaches an instrument, the HOWARDACD, using the GNSS and the stored locations of each skid's instruments, and may detect the reader's proximity to the instrument and prompt the reader to enter the instrument's reading by displaying a stored image of the instrument to be polled along with an interactive form. If the instrument is wireless-enabled, the HOWARDACD can automatically, or with reader permission, wirelessly interrogate the instrument to obtain the reading. If the instrument is not wireless-enabled, the HOWARDACD prompts the user to enter the reading manually using a manual input such as a stylus or finger on a touch-sensitive pad, a dedicated keypad, or the like. The HOWARDACD may then compare the reading to stored or dynamically uploaded norms and alert the reader of a likely data entry error or any abnormal condition reflected by the instrument's reading. The HOWARDACD may prompt the reader to continue to gather readings from each of the instruments on the skid, and alert the reader if any instrument's reading has not been recorded in the HOWARDACD. In one embodiment, the HOWARDACD includes visual cues as to the status of the reading. For example, instruments that have had the data entered are shaded in whereas those that have not yet had the data entered are outlined.

Further, the HOWARDACD can prompt the user to continue the data collection process at nearby skids, and repeat the data collection process for each skid by graphical prompts displayed on the ARUI. By automatically or manually entering readings, the HOWARDACD reduces the time to enter the data, prevents illegible entries, reduces misattributed entries, and prompts the reader to confirm out-of-tolerance entries. The ARUI accomplishes all of these functions using intuitive and easy-to-understand graphical indications.

When the reader wishes to transfer collected data from the HOWARDACD to a centralized data collection computer system, the reader uses one or more of the HOWARDACD's communication systems to transmit the collected data. If the HOWARDACD acquires service for a cellular telephone system, the HOWARDACD can transmit the data using its cellular telephone communication capability. If such service is not available, the user may transmit the data to a receiving unit on the inspection vehicle, which may either store or retransmit the data. The reader may also return to the centralized data collection system location and use the HOWARDACD's short-range wired or wireless communication systems to transmit the data to the centralized data collection computer system. Because the central data collection facility receives data communicated directly, or indirectly, from the HOWARDACD to the centralized data collection computer system, the process eliminates data entry by the collection facility, eliminates data transcription errors, and greatly reduces the time to transfer the data.

Besides decreasing the costs and increasing the accuracy of collecting, recording, and transmitting data, the present invention also decreases the time to respond to out-of-tolerance readings. If a reader records an instrument reading that is out of normal operating condition limits, the HOWARDACD can display a digital image of, or other information about, the instrument so the reader can confirm that the correct instrument is being read. In some embodiments the color coding is keyed to the specific instrument and the safety limits of the instrument. For example, a pressure instrument that is within normal range will appear as green in the ARUI. The same instrument that is in dangerous ranges will change color in the ARUI from green, to yellow, to orange, to red, as the dangerous range increases. In this embodiment, a reader would approach a skid and, using the HOWARDACD, be able to see immediately the instruments' readings outlined in various colors and know the overall danger level and status of the skid at a glance.

Further, the HOWARDACD can crosscheck the HOWARDACD's position with the instrument's stored or calculated geographical location and notify the reader of any differences. The HOWARDACD can also prompt the reader to take additional actions such as take a digital photograph of the instrument, take some action to reset or re-interrogate the instrument, tag the instrument for maintenance personnel, or perform some other task. The HOWARDACD can also identify the instrument in a maintenance database as one needing repair. In case of a dangerous condition, the HOWARDACD may alert the reader to terminate the inspection, to evacuate all personnel from the area, and optionally alert safety, security, and compliance personnel (e.g., fire, police, EPA) of the dangerous condition.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

Figure 1:
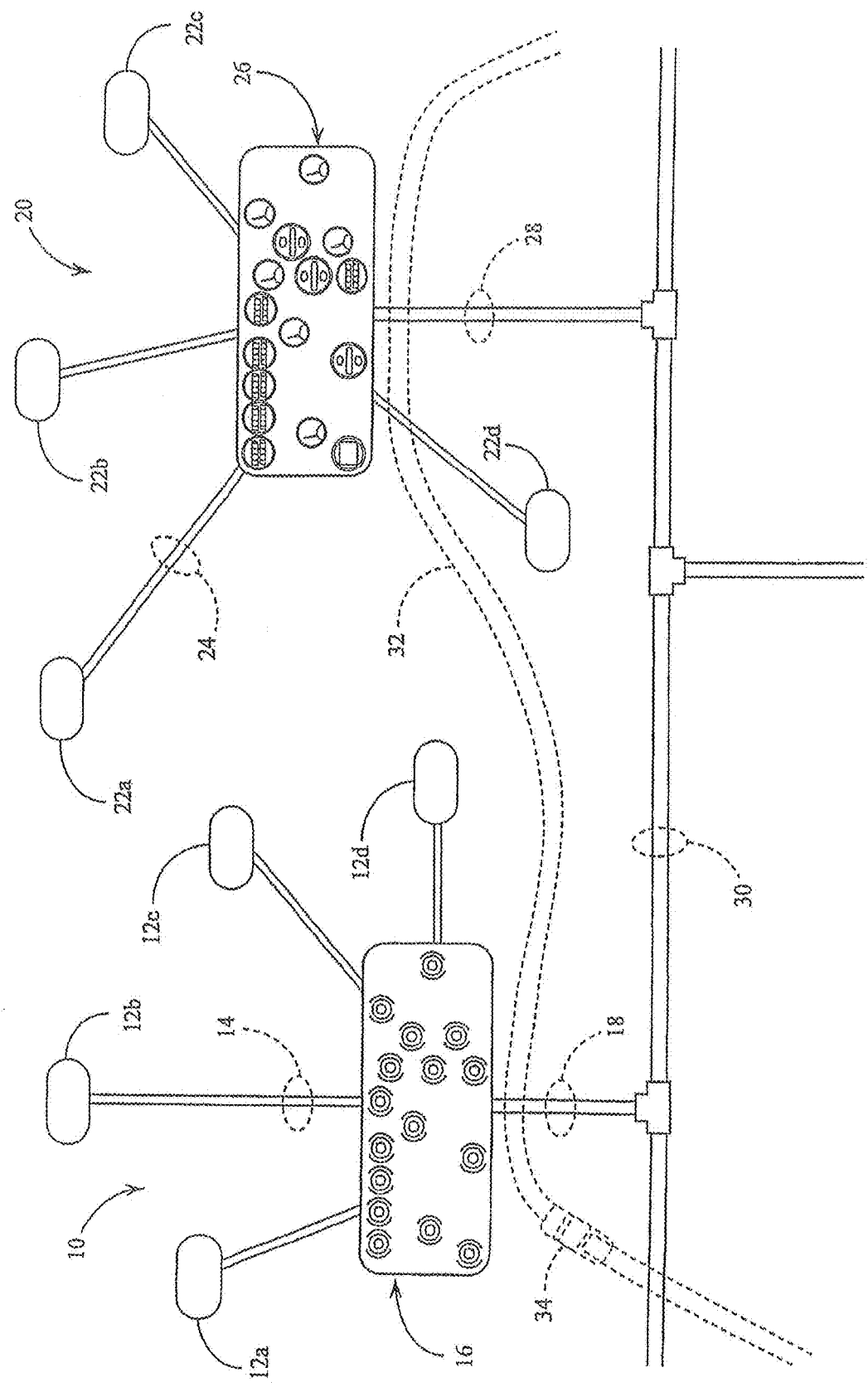
FIG. 1 represents a schematic plan view of a typical oil and gas field with two examples 16, 26 of the various types of collection platform/skids, each one serving a group of natural gas wells 12*a*-12*d* and 22*a*-22*d*.

Reference is made first to FIG. 1 representing a schematic plan view of a typical oil and gas field with two examples of the various types of collection platform/skids, each one serving a group of natural gas wells. Each platform/skid is accessible by a vehicular road shown in dashed lines in FIG. 1. A first local gas well field collection area 10 includes a number of individual gas wells (well heads) 12*a*-12*d*. Gas well to collection platform flow lines 14 connect the individual gas wells to gas collection platform/skid 16.

Figure 2A:
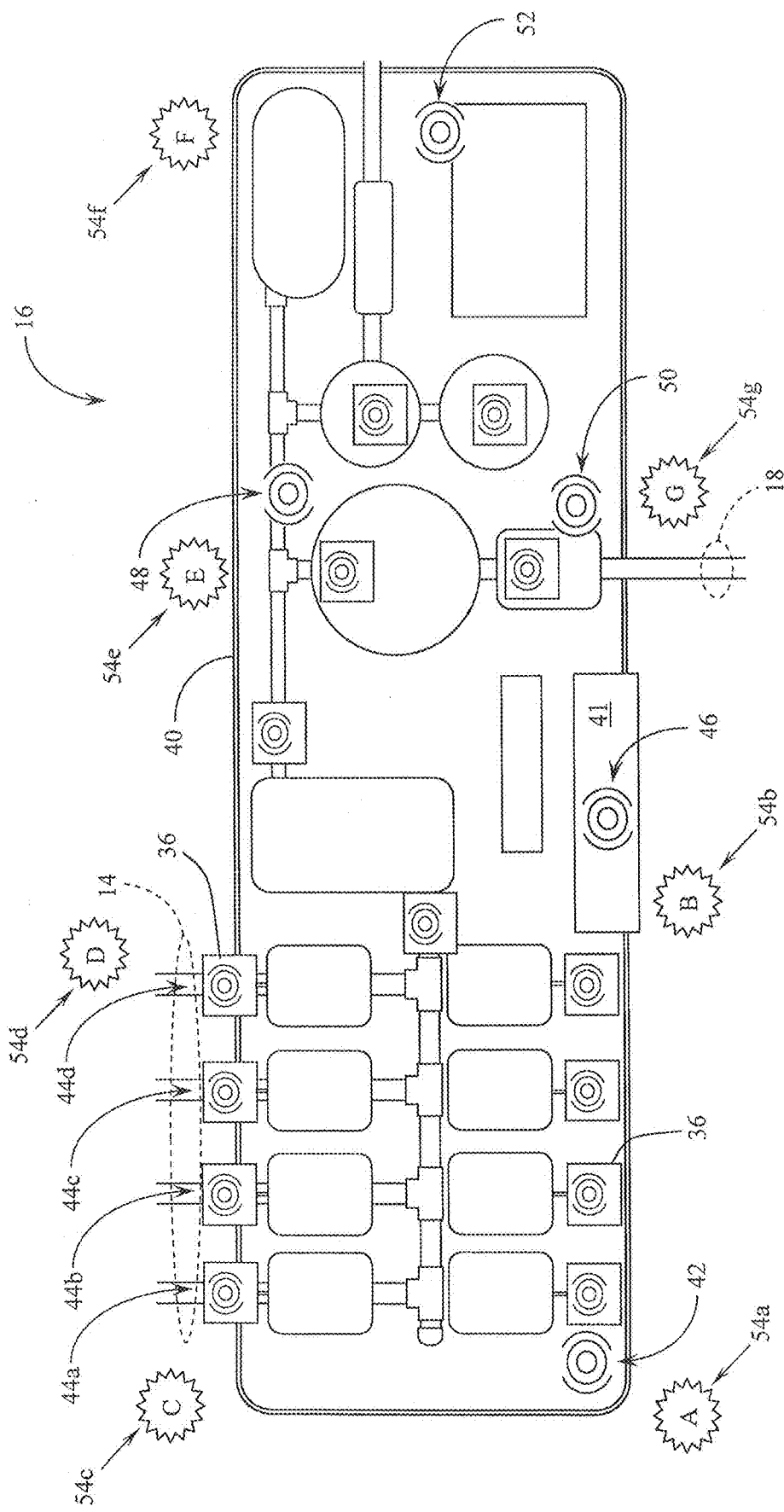
FIG. 2A is a top plan view of a typical gas field platform/skid 16 with collection lines and a production line, as well as a variety of flow conduits, tanks, valves, and control mechanisms in place to appropriately measure, monitor, and control the flow of natural gas.
Figure 2B:
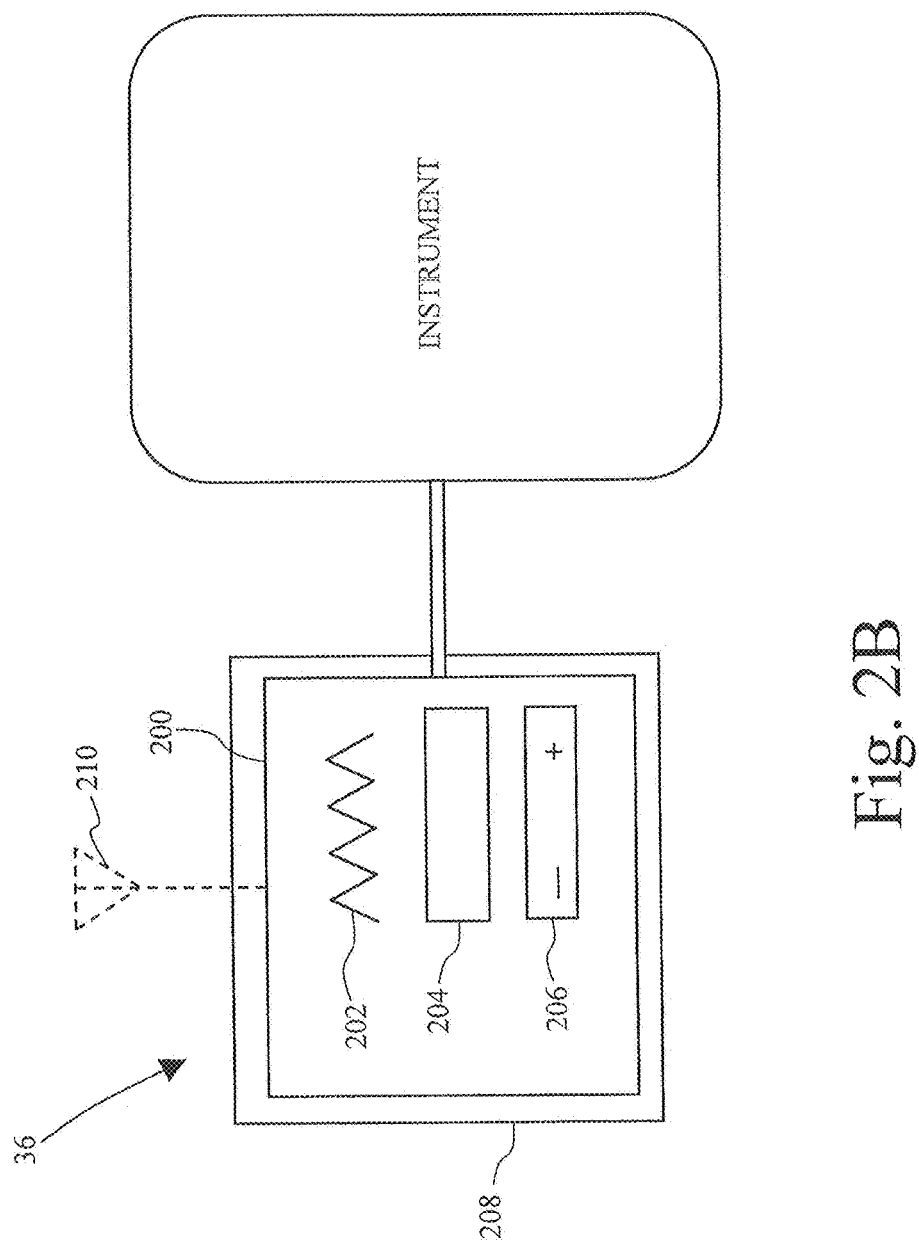
FIG. 2B is a schematic diagram of one embodiment of a remote transceiver.

In the first gas field example provided, gas collection platform/skid 16 is an electronic data collection based platform incorporating one or more wireless data transmission devices, more preferably being remote transceivers 36 (as shown in FIGS. 2A & 2B) which are described in more detail in U.S. Pat. Nos. 8,289,184 and 8,373,576, both of which are incorporated by reference in their entirety into the present disclosure. These devices, identified generically on platform/skid 16 with RF wave symbols emanating from various points on the platform, are mounted on and/or connected to one or more gauges, flow meters, and/or sensors located on platform/skid 16. Remote transceivers 36 are components of a preferred short-range wireless communication system and are capable of transmitting the data collected by such gauges, flow meter, and/or sensors to an HOWARDACD. The HOWARDACD may be newly developed but may also be chosen from or adapted from those that are commercially available. Potential examples of HOWARDACD's include systems marketed under the trademarks Google Glass, Microsoft HoloLens, Samsung Gear VR, Android phones and tablets, Apple iPhone, or Apple iPad, or may be embodied to consist of or include a personal digital assistant (PDA), or a notebook personal computer. The HOWARDACD may also include virtual reality devices like the Oculus Rift or HTC Vive. The HOWARDACD defined in this application refers to handheld devices as well as devices that users wear like eyeglasses and any other such devices sufficient to implement the invention. Remote transceivers 36 may be configured to continuously transmit data, to periodically transmit data, or to transmit data upon being interrogated, depending on the requirements for the particular characteristic being monitored. Remote transceivers 36 may be wirelessly linked to a hub or gateway unit (not shown) such that the hub and remote transceivers 36 are capable of two-way wireless communication with one another. Although in preferred embodiments remote transceivers 36 are capable of sending and receiving wireless signals to and from the hub, remote transceivers 36 are not linked with one another such they are not capable of communicating with one another.

Certain instruments may also communicate with the HOWARDACD by providing reading information, but may also dynamically upload other information to the HOWARDACD, meaning automatically or in response to the user's selection, send the HOWARDACD information about the instrument such as its type, features, unique identification, and the like.

Connecting gas collection platform/skid 16 to primary gas field production line 30 is collection platform production line 18. This set of pipelines connects a number of discrete gas well field collection areas together at a point where it is no longer necessary to separately monitor individual field or individual well production.

A second local gas field collection area 20 is likewise shown in FIG. 1 encompassing individual gas wells (well heads) 22a-22d. Gas well to collection platform flow lines 24 conduct the natural gas from each of the individual gas wells 22a-22d through to gas collection platform/skid 26. In this example, gas collection platform/skid 26 may be primarily a visual data collection-based skid as opposed to a wireless transmission data collection system. As with the first gas well field collection area, the collected natural gas from platform/skid 26 is conducted to primary gas field collection line 30 by way of collection platform production line 28.

In the second gas field example provided in FIG. 1 the platform/skid 26 is predominantly characterized as requiring visual inspection for record keeping and monitoring. Much like a home gas or electric meter, the visual data collection-based skid utilizes gauges, meters, and sensors that provide only visual indications of the characteristics they are measuring. As a result, the basic manner of collecting the data involves "reading the meter" and recording (preferably into an electronic handheld device) the numerical information read. In FIG. 1 therefore, platform/skid 26 is shown to include a variety of discrete analog pressure gauges, digital flow meters (for cumulative flow), and analog flow meters (for instantaneous flow). The details of such devices and the manner in which the system of the present invention can accommodate them are further described below. In practice, implementation of the present invention will likely occur in fields where the data collection is being carried out in mixed modes, utilizing some wireless data collection devices and some visual inspection data collection devices. The system of the present invention is versatile and adaptable to the extent that its use is not dependent upon the implementation of only a single mode of data collection.

As indicated above, the collection of data from each of the individual skids can be carried out according to a number of different methods and by way of a variety of protocols. A first method may simply include the visual inspection of a number of metering and monitoring devices situated on the platform. This data may be entered into the HOWARDACD from which it is wirelessly, or through a hard-wired docking connection, communicated through data acquisition software eventually to a centralized data collection system, being relayed through a link in the inspection vehicle or wirelessly through a variety of different regional signal communication lines. FIG. 1 presents in general, therefore, the field of use of the present invention and the manner in which the systems and methods of the invention are implemented in conjunction with a variety of gas well field collection platforms and/or pipeline insertion platforms areas.

FIG. 2A is a top plan view of a typical gas field platform/skid with collection lines and a production line, as well as a variety of flow conduits, tanks, valves, and control mechanisms in place to appropriately measure, monitor, and control the flow of natural gas. Those skilled in the art will recognize that the skid structure shown in FIG. 2A is provided by way of example only, and that a variety of different skid structures with many different types of gauges, sensors, meters, and detectors, are anticipated as being appropriate for use in conjunction with the systems and methods of the present invention. In FIG. 2A, gas well to collection platform flow lines 14 arrive at the gas collection platform/skid 16 as described above in conjunction with FIG. 1. Typically, these collection flow lines are situated near one section of the platform, regardless of the direction from which the various flow lines arrive from the dispersed wells. Collection platform production line 18 exits the platform as shown after a number of different metering, monitoring and conditioning efforts are made with the natural gas production.

Platform/skid base 40 in the preferred embodiment of the present invention may be a flatbed trailer or a skid module, as is typically utilized in conjunction with the establishment of a central collection point for a natural gas field or for a pipeline insertion point. A variety of different pumps, tanks, reservoirs, separators, dryers, and metering components are incorporated into the flow lines associated with the collection and distribution of the natural gas as it flows from the wells to the primary gas field production line and beyond into natural gas transfer and distribution systems. As shown in FIG. 2A, a number of different monitoring components are positioned on platform/skid base 40 in conjunction with the various functions that are carried out on the skid. In the example shown in FIG. 2A, the data collections devices on the skid are associated with remote transceivers 36 which are characterized as universally wireless, as would be in a preferred embodiment of the invention. Those skilled in the art will recognize how non-wireless devices might be substituted or mixed in with the wireless transmission devices shown. Also as mentioned above, the wireless data transmission devices may generally fall into one of three categories of transmissions: (a) continuous transmission; (b) periodic transmission; or (c) interrogated transmission. The system of the present invention accommodates all of these variations.

Initially, some identification of the skid may be provided with skid identification (ID) transmitter 42. This allows the monitoring individual to identify the location where data is about to be collected and recorded, preferably by way of a wireless communication from the skid ID transmitter 42 to the HOWARDACD by the monitoring individual. Alternately, in a preferred embodiment, the identification of the skid may be carried out by a simple GPS reading taken in proximity to the skid. Such an "automatic" identification would, of course, depend upon a database record associating a particular skid with a geographic location identifiable by GPS coordinates. Such an automatic identification of the data collection location would allow for the elimination of a unique skid ID transmission and could therefore greatly simplify the electronic instrumentation transmitting the data. Each platform/skid could be identical (anonymous) with only the geographic location providing the necessary skid identification.

In preferred embodiments, once a particular skid is identified, the HOWARDACD monitors the available wireless transmissions from every instrument on the skid. Such wireless transmissions may be in the form of radio frequency (RF) signals, most preferable as Bluetooth® signals. The HOWARDACD is programmed to detect and identify the instruments located on the skid by their respective wireless transmissions, which are transmitted by the various remote transceivers 36 which interface with the instruments. Preferably, each remote transceiver 36 located on a particular skid is simultaneously detected by the HOWARDACD once the HOWARDACD is within the detection range of the wireless radio frequency signals. Remote transceivers 36 associated with the skid, as well as the HOWARDACD, are preferably Bluetooth®-enabled devices which allows for the identification of the instruments and the exchange of data from the instruments to the HOWARDACD in a short-range communication network.

In some embodiments, for the instruments to be identified and/or to communicate associated data to the HOWARDACD, each of the instruments may be connected with a remote transceiver 36 capable of transmitting a wireless radio frequency signal, preferably a Bluetooth® signal. In such embodiments, radio frequency signal strength is directly related to proximity in that the closer the HOWARDACD is to a particular remote transceiver 36, the stronger the wireless radio frequency signal transmitted from the particular remote transceiver 36 that is detected by the HOWARDACD. Preferred embodiments of the disclosed system allow for the simultaneous detection of all remote transceivers 36, and consequently each of the instruments, associated with a particular skid by the HOWARDACD.

In an alternate embodiment, the skid's GPS coordinates, the skid's compass direction orientation, and a predetermined skid configuration are combined so that the HOWARDACD can calculate the geographical location of each skid's instruments and communicate with them accordingly. For example, a skid manufacturer may make multiple skids with a single configuration such as that shown in FIG. 2A. Each of the instruments on the skid is located at a fixed distance and relative angle from the skid transmitter. With the skid transmitter's GPS coordinates, the skid's directional orientation, and the relative angle and distance of each instrument from the skid transmitter, the HOWARDACD can calculate the GPS coordinates of each instrument and display the appropriate monitoring data or data input screen for the nearest instrument.

In some embodiments, when a user approaches the skid, the HOWARDACD is able to detect one or more remote transceivers by receiving a wireless radio frequency signal from the remote transceiver(s) 36. It is anticipated that once the HOWARDACD is within sufficient range to receive RF signals from remote transceivers 36, the HOWARDACD will be capable of simultaneously detecting all of the remote transceivers positioned on the particular skid. A user will then be able to selectively interrogate or receive data from a particular data collection device on the skid based on proximity and signal strength. The nearer the HOWARDACD is to a particular remote transceiver, the stronger the signal that is received by the HOWARDACD from the remote transceiver. For instance, if the user is standing at position D (54d), the HOWARDACD can display information pertaining to 44d since this instrument, in accordance with its connection with remote transceiver 36, is the closest to position D, and hence is transmitting the strongest RF signal received by the HOWARDACD at that particular location. Alternatively, at the same location (position D), the HOWARDACD may allow the user to select information pertaining to any of instruments 44a-44d.

Associated with gas well to collection platform flow lines 14 may be one or more gas well flow line flow meter gauges 44a-44d. These flow meters would, of course, individually monitor the flow of natural gas from each of the individual wells from within the field collection area that arrive at the platform. Positioned along one edge of the platform/skid base 40 is skid control panel 41 which includes control systems and operational data record/transmission systems associated with the operation of the skid. Typically, this control panel is positioned at a working level on the perimeter of the skid in order to allow easy access by monitoring personnel. An example of the array of instrumentation and controls that might typically be found on such a control panel is described in more detail below with FIG. 2. Other instrumentation positioned on platform/skid base 40 may include devices such as liquid separator operational data record/transmitter 48 as well as platform production line flow meter gauge data transmitter 50. Additionally positioned at various locations on the platform/skid base 40 may be one or more leak detection data record/transmitters 52. Further included would preferably be an array of flow meters, pressure gauges, and temperature sensors, appropriately positioned on the skid and all capable of communicating their collected data to a receiving device in a manner described in more detail below with FIGS. 4 & 5.

The various monitoring, metering, and safety sensors positioned on platform/skid base 40 are intended to provide all the necessary data and information to safely maintain the skid as a collection point for natural gas flowing from a plurality of individual wells. The system is intended to not only monitor flow rates for the purposes of inventory management, but also to monitor conditions on the skid, both for the efficient operation of the skid and the safety of the skid and those monitoring it. Also shown in FIG. 2A, and anticipating the operation of the system of the present invention, are a number of data collection stations shown with multi-point star tags lettered A-G. These data collection stations 54a-54g provide standardized, semi-isolated locations around the skid where interrogation of the various wireless remote transceivers 36 may occur. As with the skid as a whole, remote transceivers 36 may include an ID within their data signal that associates the data with a particular device in a particular location on the skid. The HOWARDACD for collecting data from the various wireless transmitting devices is capable of detecting the wireless signals transmitted by remote transceivers 36 on the skid, such capability preferably including the simultaneous detection of all wireless signals being transmitted remote transceivers 36 located on a particular skid. For the collection of data, the closer in proximity the HOWARDACD is to a particular remote transceiver 36 on the skid, the stronger the signal which is detected. Alternately, the data collection stations 54a-54g may be geographically separated by a sufficient distance to use the station's GPS coordinates to uniquely identify the station. For example, the only flow meter signal capable of being read at data collection station 54g would be flow meter 50 associated with the outflow of gas from the platform. The meter 50 may therefore transmit an anonymous signal that is associated or identified with a specific skid and a specific location on that skid by way of its GPS coordinates. Here again, it is anticipated that the real world will include a mix of devices, some that will require visual inspection, some that will transmit an identifying signal along with their data either by way of a connected remote transceiver or an integrated transmitter, and some that will anonymously transmit their data and rely on a GPS coordinate to identify their location.

Turning now to FIG. 2B, there is shown a schematic diagram of a typical remote transceiver 36 attached to an instrument associated with a skid. Remote transceiver 36 may be constructed based on a printed circuit board 200. In some embodiments, the structure as illustrated is contained within an enclosure 208. In other embodiments, remote transceiver 36 may be entirely contained within an instrument or sensor with which remote transceiver 36 is associated.

A power supply 206 may also be provided to allow for untethered remote operation. In one embodiment, power supply 206 is a replaceable battery. However, rechargeable batteries or other power supplies could also be used in the present embodiment. A microcontroller 204 implements and controls the functions and operations of remote transceiver 36 described herein. Microcontroller 204 can be a general purpose microprocessor programmed according to the needed functionality, but could also be an application-specific integrated circuit (ASIC), a field programmable gate array (FPGA), or other computational device.

Also as illustrated in FIG. 2B, remote transceiver 36 provides an internal antenna 202 that is situated directly on printed circuit board 200. This allows remote transceiver 36 to be completely enclosed within enclosure 208 for increased durability and/or resistance to the elements. However, in some embodiments, and as is shown in FIG. 2B, remote transceiver 36 is equipped with external antenna 210 (shown in dotted line) in order to increase the reception or broadcast range of remote transceiver 36. In preferred embodiments, remote transceiver 36 interfaces with one instrument associated with the skid. It is understood that, in some cases, remote transceiver 36 may interface with two or more such instruments.

With regard to remote transceiver 36, it is also understood that other electronic devices may be included with the instruments, placed in the enclosure, or attached to printed circuit board 200. These devices may provide functionality for carrying out such duties as recharging battery 206, signal conditioning and/or amplification for the inputs from the instruments, and other functions not carried out by microcontroller 204.

Figure 3:
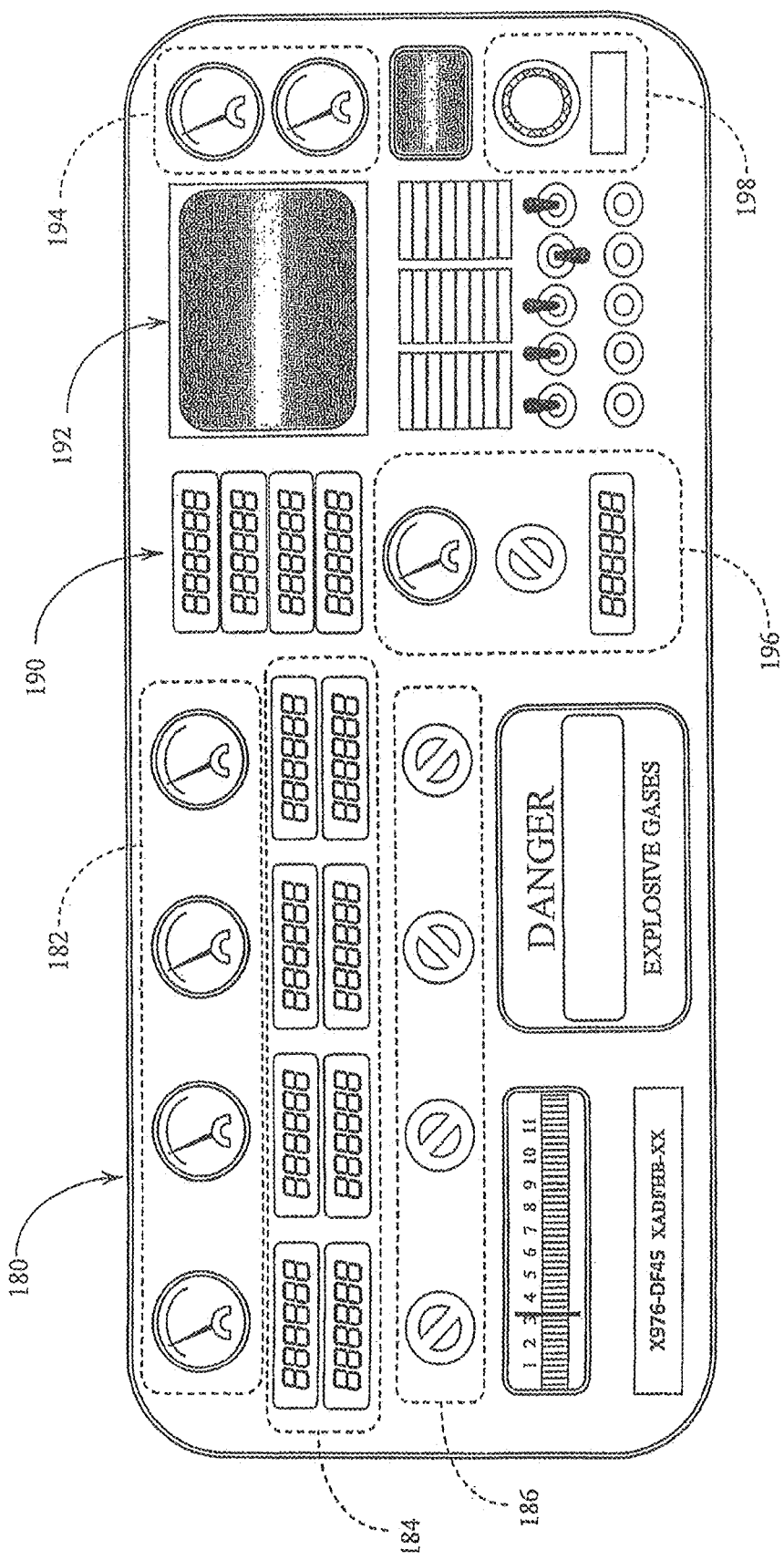
FIG. 3 is a side plan view of a typical platform/skid control panel 180 integrating some of the wide variety of instruments and controls associated with the operation of the skid.

FIG. 3 provides a side plan view of a typical platform/skid control panel 180 integrating some of the wide variety of instruments and controls associated with the operation of the skid. The representation shown in FIG. 3 is intended to include examples of the various instruments and controls rather than to provide a view of any specific control panel structure. Control panel 180 in practical situations would likely have fewer than all of the instruments and controls that are exhibited in this view. Many of the components shown may comprise discrete components located only in conjunction with the locations they are intended to monitor. In some instances, however, these components (e.g., meters, gauges, sensors, valve controls, lights, alarms, etc.) are consolidated into the skid control panel such that a monitoring person may monitor and control all the instruments on the entire skid from the single location of the control panel.

Control panel 180 as shown in FIG. 3 includes an array of gas well flow line pressure gauges 182 as well as gas well flow line flow meters 184. Flow meters 184 may include both cumulative flow and instantaneous flow indicators. Also provided on control panel 180 may be control mechanisms such as gas well flow line valve controls 186. These controls located on panel 180 may, of course, be mechanical, electromechanical, or electronic in their operation. A similar set of instruments and controls may be provided for the output system on the skid with outflow gauges and controls 196. Other components present on control panel 180 may include additional digital flow meters 190 and additional analog (or digital) pressure gauges 194. Various re-settable alarms 198 may provide visual and/or audible indications of dangerous or anomalous conditions on the skid.

As the systems and methods of the present invention anticipate a variety of different skid structures it is possible that some of the data processing capabilities may be moved to components on the skid and in particular to a so-called "smart" control panel 180. As described in more detail below, data collection on the skid may be partially accomplished prior to the actual visit by monitoring personnel. It is anticipated that some level of data collection may occur from the various instruments on the skid into a data storage component associated with control panel 180. Access to such may be provided to the monitoring personnel through both the wireless connection that may be established through proximity to the skid and through manual input and audio-visual display systems 192 present on the control panel. Once again, it is not anticipated that all of the various components and capabilities shown and described in FIG. 3 will necessarily be present on each skid control panel and as such the view is intended to be merely representative of the variety of different panels that might be encountered.

Figure 4:
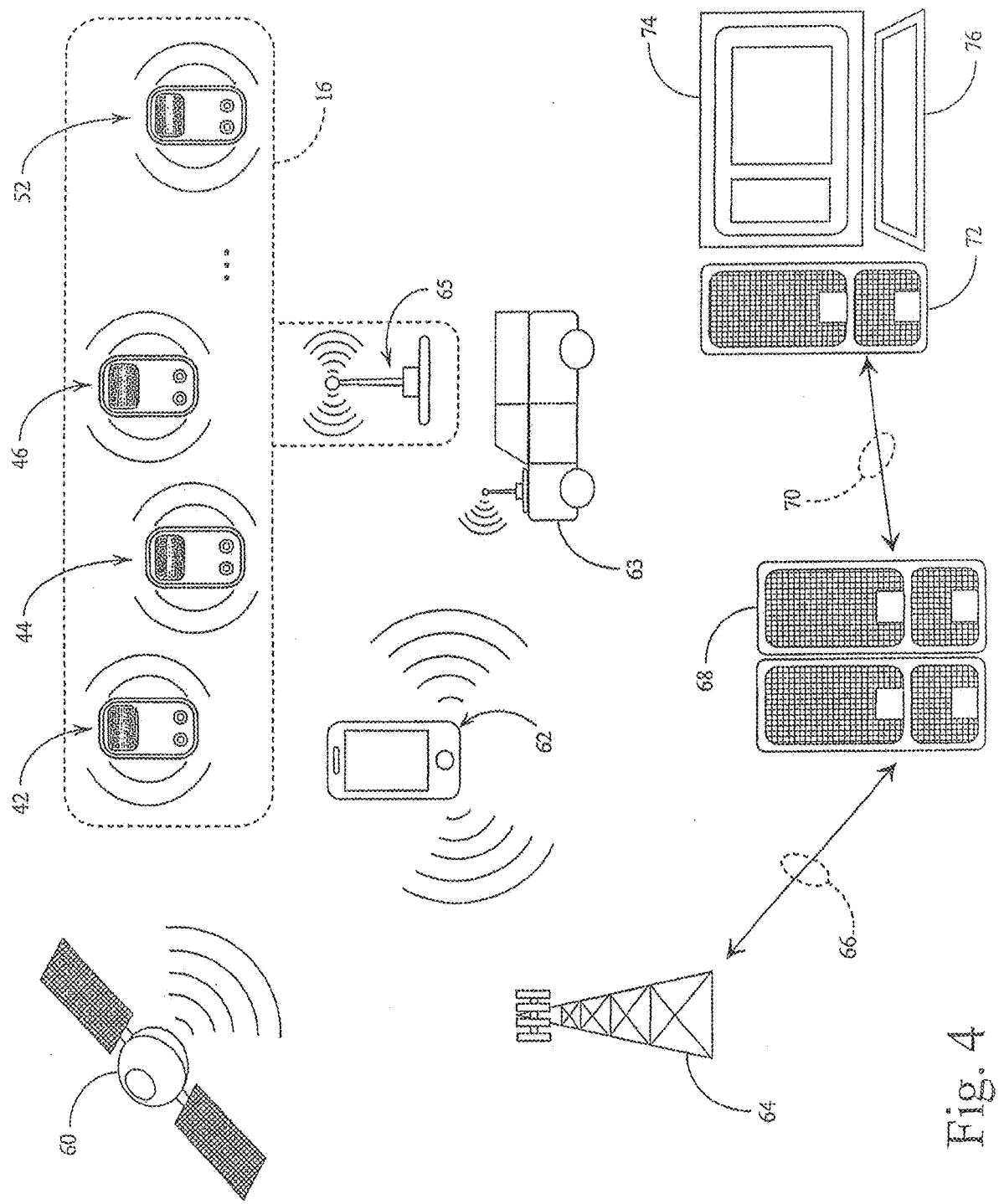
FIG. 4 represents a schematic diagram of alternate embodiments of the systems and method of the present invention utilizing radio-frequency communication between a handheld computing device, preferably a handheld augmented reality computing device (HOWARDACD) 62 and electronic data sensors 42, 44, 46, 52 positioned on the platform/skid 16.
Figure 5:
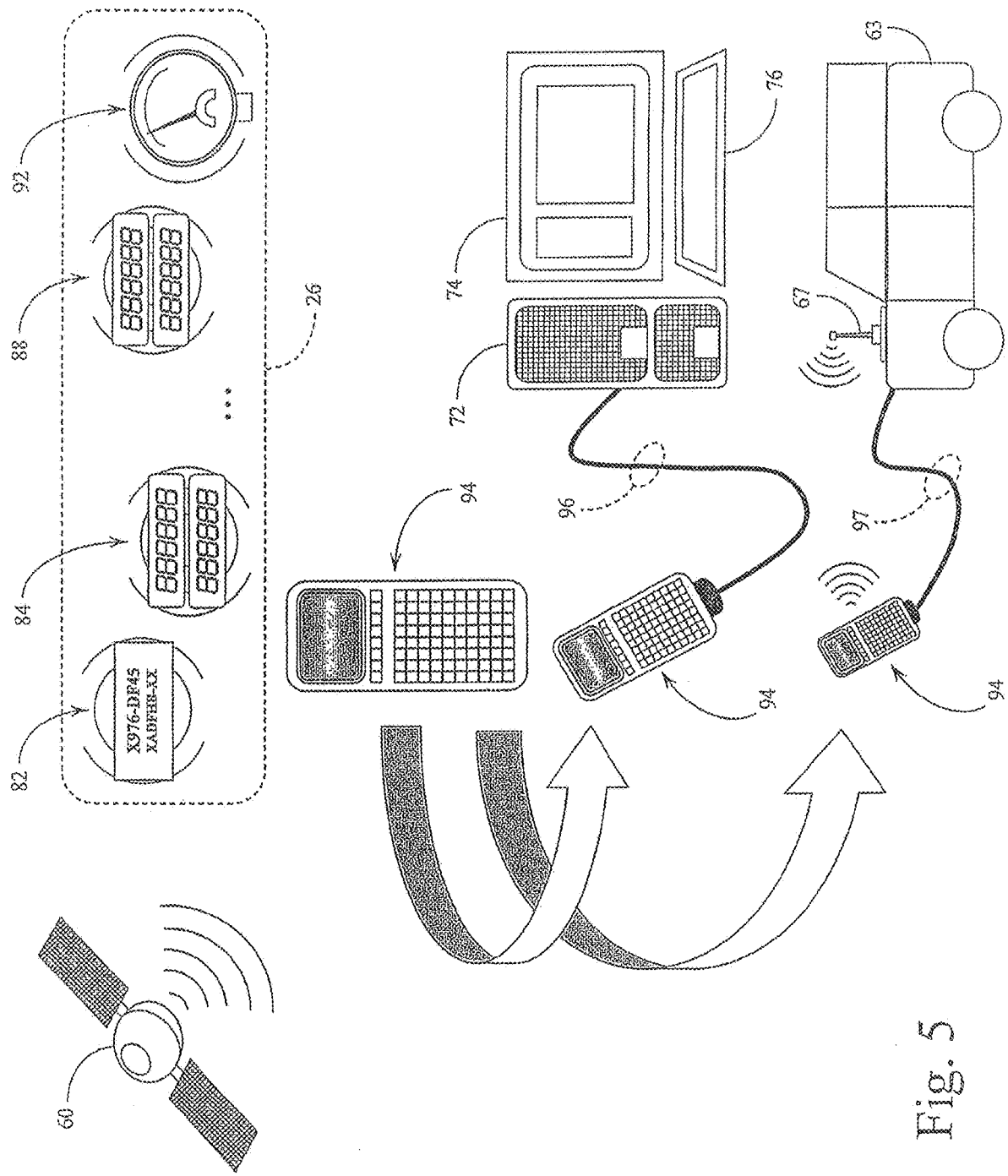
FIG. 5 represents a schematic diagram of alternate embodiments of the system and method of the present invention using manual data entry on a handheld computing device, preferably a handheld augmented reality computing device (HOWARDACD) 94 from a visual reading of the various digital and analog meters and sensors 82, 84, 88, 92 positioned on the platform/skid 26.

Reference is now made to FIGS. 4 & 5 which represent schematic diagrams of alternate embodiments of the system and method of the present invention, one (FIG. 4) utilizing radio-frequency communication between a handheld computing device (HOWARDACD) and the electronic data sensors positioned on the platform/skid, and a second (FIG. 5) representing manual data entry on a handheld computing device (HOWARDACD) from a visual reading of the various digital and analog meters and sensors positioned on the platform/skid.

FIG. 4 represents a preferred embodiment wherein most, if not all, of the data communication is carried out wirelessly. Gas collection platform/skid 16 is represented schematically in FIG. 4 primarily as a collection of individual data transmitters carrying out the functions described above. Skid ID transmitter 42, for example, may be positioned in such a manner as to broadcast a digital signature associated with that particular skid (although as mentioned above, this device may be omitted if the system provides for identification by GPS coordinates). Gas well flow lines flow meter gauges 44 likewise may wirelessly transmit data indicating the metered flow rates (e.g., cumulative flow volume, instantaneous flow, etc.) from the various flow meter gauges positioned on the skid. Control system operational data record/transmitter 46 may provide the data associated with the skid control panel positioned on each skid as described above. Leak detection data record/transmitter 52 in a similar fashion may provide monitoring data associated with the presence or absence of leaks in the natural gas flow lines. The leak detection device has a battery to power its wireless transmitter, where the battery life is typically ten years. These devices shown in FIG. 4 are intended to be representative of a large array of such data instrumentation position on the skid, all of which may be in data communication with an appropriately configured data collection receiver.

Ancillary to the devices on the gas collection platform/skid 16 is another transmitting device that contributes to the collection of data from the particular skid. GPS satellite system 60 is shown as a schematic representation of the typical array of multiple global positioning satellites that contribute their signals to pinpoint the location of the data being collected in a handheld device (for example) as the monitoring personnel might carry the device to each individual skid. In fact, as mentioned above, the accuracy of such systems now makes it possible to discern positions around each individual skid to monitor specific locations on the skid.

All of the above data transmitters are configured to transmit data to one or more similarly configured handheld computing devices (HOWARDACD) 62, which in the preferred embodiment may be a personal data assistant (PDA) configured with Bluetooth® RF communication components and/or cellular communication transceivers. As data is collected from the skid by way of the reception of the signals from each of the above referenced monitors, transmitters, gauges, etc., preferably based on proximity of HOWARDACD 62 to remote transceivers 36 associated with such monitors, transmitters, gauges, etc., the information may then be relayed by a number of different methods (through various channels) to a central collection location where the data is accumulated, reported, and used. In FIG. 4 three paths to downloading this data are represented. A first path using HOWARDACD 62's long-range communication system communicates the data that has been collected on HOWARDACD 62 by way of cellular communications tower 64 as part of a regional cellular communications network 66. According to this communications path, various Internet service provider (ISP) servers 68, which are connected to the cellular communications network 66, relay the data to an ISP service line 70 which is in turn connected to an individual IP address location in the form of a central office data processor 72. The typical central office processor display 74 and central office processor user input device (keyboard) 76 are utilized in conjunction with the final software driven functions associated with the collection of data and the generation of necessary reports, alerts, etc., all utilized in conjunction with the monitoring and inventory of the natural gas well field.

An alternate data communications route for downloading the collected data shown in FIG. 4 involves short-range wired or short-range wireless communication between HOWARDACD 62 and a vehicle-based data collection receiver 63. In some instances, the individual natural gas fields where data is being collected and monitored are outside the range of regional cellular telephone communications networks and it becomes necessary to transmit the data locally to an electronic data collection device, preferably affixed to or carried in the vehicle that is being used to carry the monitor and control personnel to each location. Implementation of the methods of the present invention would involve a user interrogating the skid and its various sensors and data collection device transmitters and then returning to the vehicle where the HOWARDACD 62 may be docked (physically or by RF signal handshake) to a communications cradle (or a transceiver such as a Bluetooth® device) that automatically downloads the data just collected from the skid being visited. In a preferred embodiment of the systems and methods of the present invention, data communication is carried out primarily through proximity-induced RF connections that are established or broken by moving in and out of a specified range. In this manner, the system operates most transparently to the user, automatically collecting data and then automatically downloading data via the communications relay chain to the central data collection system.

A third data communications path disclosed in FIG. 4 utilizes skid-based local/regional transmitter 65. The placement of a more powerful regional transmitter device directly on the skid allows for the possibility of direct communication between the skid (and its various electronic instruments) with either a regional cellular network or some other established RF communications network. Such a system might be used in conjunction with HOWARDACD 62 or separate from it. Skid based transmitter 65 may simply be a transceiver capable of "boosting" a relayed data signal from HOWARDACD 62 to a regional transceiver connected to the Internet or some other wide area network. Alternately, the data collection software that might normally be resident on HOWARDACD 62 could be incorporated into a processor on the skid 16 and carry out the data collection function of HOWARDACD 62 directly. This embodiment would, of course, be limited to those geographic areas where such regional communications are readily available.

A further alternate embodiment of the present invention may be anticipated from the use of the skid based local/regional transmitter 65. With the appropriate skid based data processor (not shown) data from each of the various wireless devices (e.g., meters, gauges, sensors, etc.) on the skid may be locally received at a central point on the skid (i.e., at the skid based local/regional transmitter 65) and stored until such time as monitoring personnel arrive at the skid to collect the data. In this embodiment, rather than moving about the skid to collect data from each device, HOWARDACD 62 may interrogate the skid as a whole through transmitter 65 and collect the entire batch of skid data at one time. Indexing of the data would, in this embodiment, require the inclusion of transmitter device ID information as part of each of the data signals. Nonetheless, GPS location information would allow HOWARDACD 62 to still identify the skid as a whole without the need for entrained skid ID signal data.

Reference is next made to FIG. 5 for a further alternate embodiment of the present invention that relies less upon the use of fully electronic sensors, gauges, and metering devices positioned on the skid, and instead utilizes many of the standard analog or digital monitoring meters and gauges often associated with older natural gas collection platforms/skids. In FIG. 5 gas collection platform/skid (visual data collection) 26 is fitted not with electronic data transmitters, but with standard analog or digital display devices. In this example, it may be necessary to utilize skid ID plate 82 that simply provides alphanumeric information regarding the identity of the skid which is keyed into HOWARDACD 94 by the monitoring personnel. In a preferred embodiment, however, HOWARDACD 94 could still benefit from the use of GPS satellite system 60. As previously discussed, with the skid GPS coordinates, skid orientation, and skid configuration, HOWARDACD 94 can pinpoint not only a specific platform/skid 26 that is being interrogated, but may also allow for the identification of the specific meter, gauge, or sensor that is being viewed at a particular point in time. It is also understood that the real world will likely include a mix of electronic (wireless) devices and older visually inspected meters and gauges. In a preferred embodiment therefore, HOWARDACD 94 includes components that allow it to receive data signals wirelessly from the instruments on the skid or to have such data input into HOWARDACD 94 by way of its manual input means. In this regard, the primary distinction between the embodiments described by FIG. 4 and those shown here with FIG. 5 relates to the manner in which the data is downloaded (or relayed) from the handheld device (62 or 94) to the central office data processor. In the system shown in FIG. 5 this communication process is carried out entirely without the use of a regional cellular network.

Visually collected information from the skid is, as indicated above, input into handheld device 94 from skid ID plate 82 (unless GPS is utilized) while a variety of other types of data are collected visually and entered manually from digital meters 84 (e.g., gas well flow lines flow meter gauges, etc.) and digital meters 88 (e.g., liquid separator flow meter gauges, etc.). There may additionally be analog gauges 92 (e.g., source line pressures, production line pressure, etc.) as well as other types of digital or analog leak detection sensors, temperature gauges, and process condition sensors. In any case, the information may be manually entered into HOWARDACD 94 by the monitoring personnel as they progress about the skid, which data entry may be, in one or more embodiments, by using a manual key input device with an LCD display as shown.

Connectable to HOWARDACD 94 is short-range wired communication system 96 which allows the monitoring personnel, upon return to a home base, to dock or otherwise connect HOWARDACD 94 to the central office data processor 72. In this manner, the data collected at each of the individual skids may be rapidly and accurately downloaded into the software applications structured for recording, reporting, and displaying information on all of the parameters described above. The standard computer processing equipment (including data display 74 and data input keyboard 76) operable in conjunction with the central office data processor 72 are utilized to carry out the software functionality associated with this recording, reporting, and displaying the gathered information.

Alternately, the system shown in FIG. 5 may operate in a manner similar to that described above with respect to FIG. 4. Instead of carrying HOWARDACD 94 back to the home office for downloading, the device may be connected to a docking station positioned in the vehicle 63 that the monitoring personnel utilize to visit each of the individual natural gas collection fields. Here again, the docking connection to the car mounted electronic data collection equipment may be by HOWARDACD 94's short-range wired communication system (e.g., hard wired as in the form of a cradle or cable connector) 97 positioned within the vehicle or may include a short-range wireless communication system 67 prompted by a digital handshake once HOWARDACD 94 is moved within range of the equipment associated with the vehicle.

Figure 6:
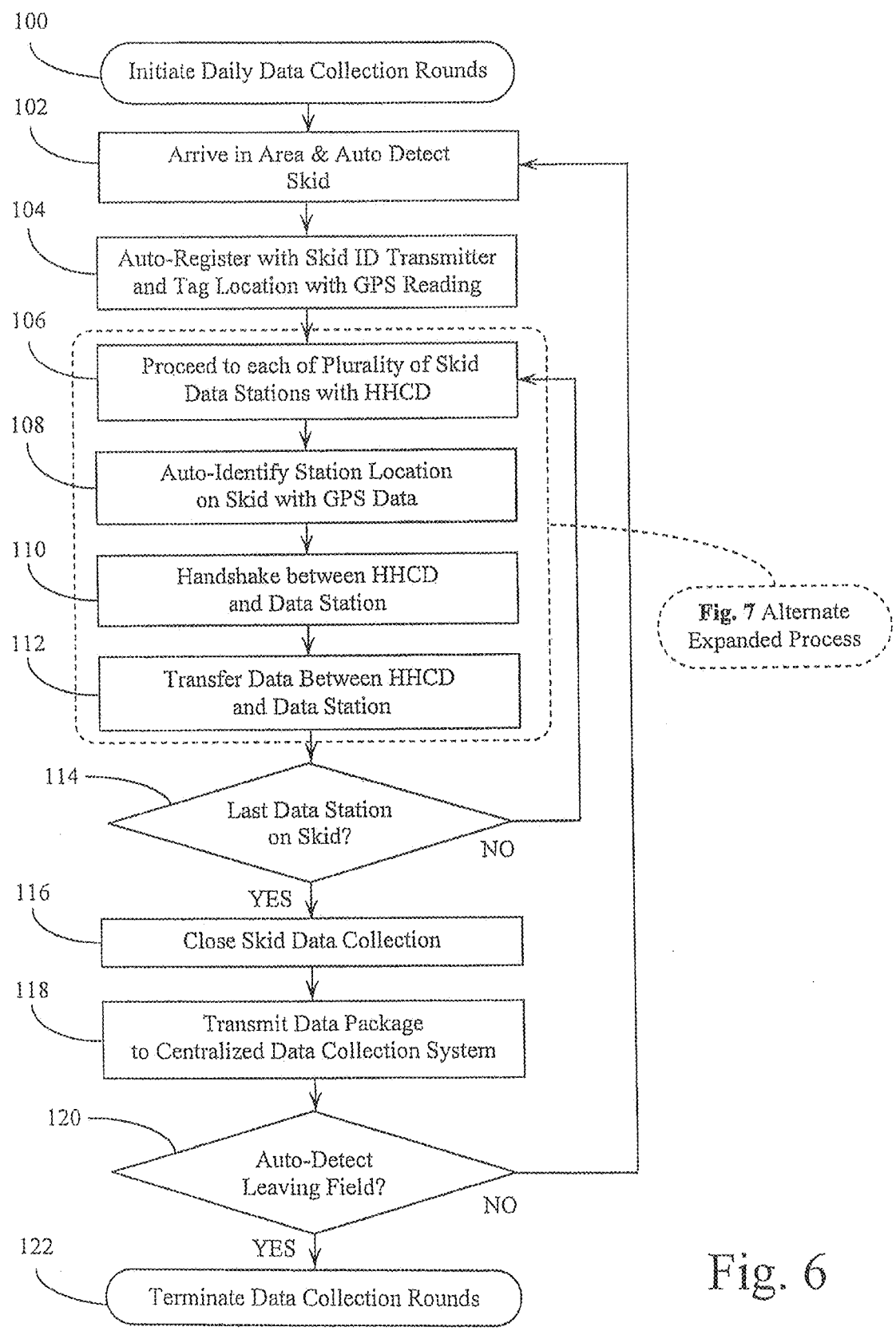
FIG. 6 is a flowchart of the process steps associated with the method for electronic data acquisition.
Figure 7:
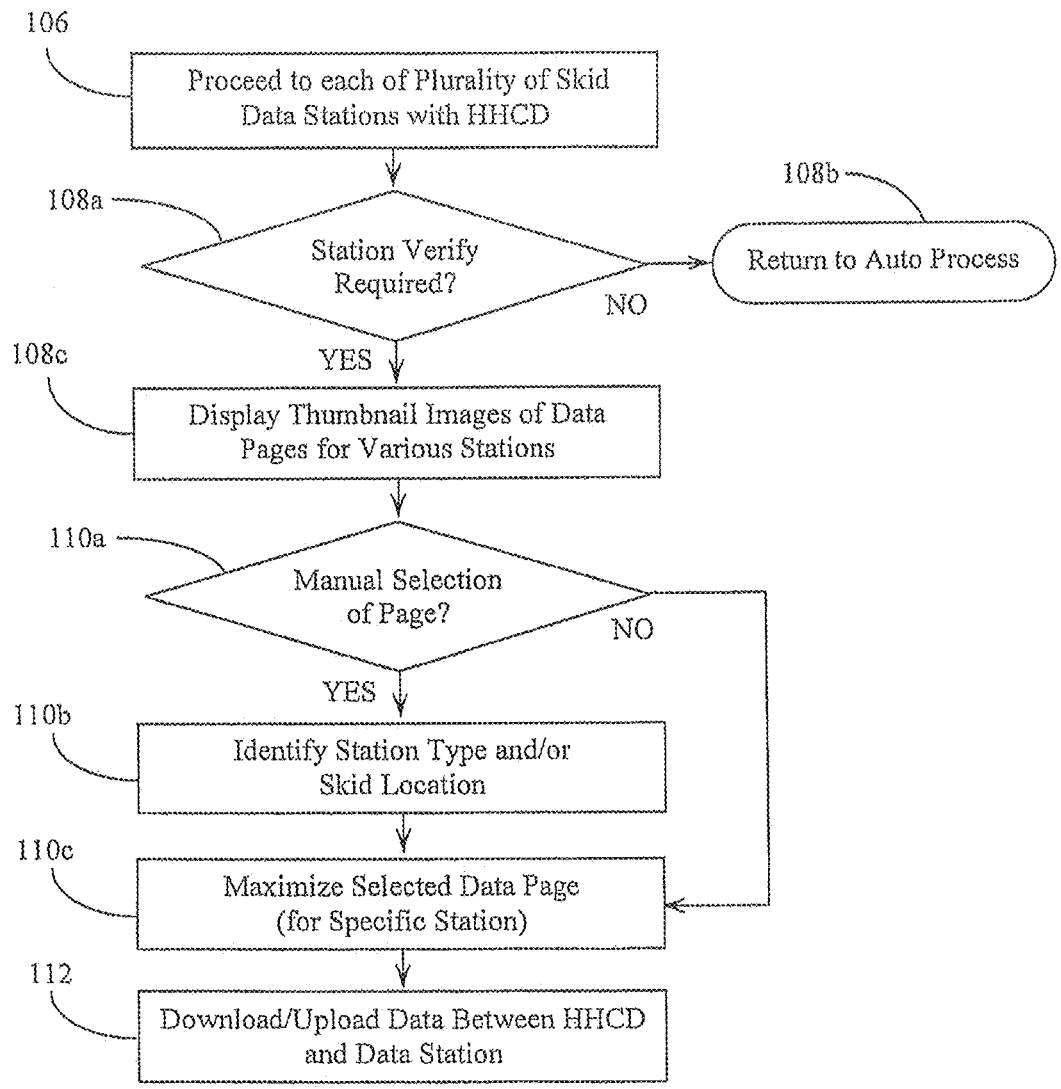
FIG. 7 is a flowchart of an alternate subroutine associated with the method shown in FIG. 6 which involves the implementation of a graphical user interface that allows the monitoring personnel to step through the collection of data screens associated with the various instruments.
Figure 8:
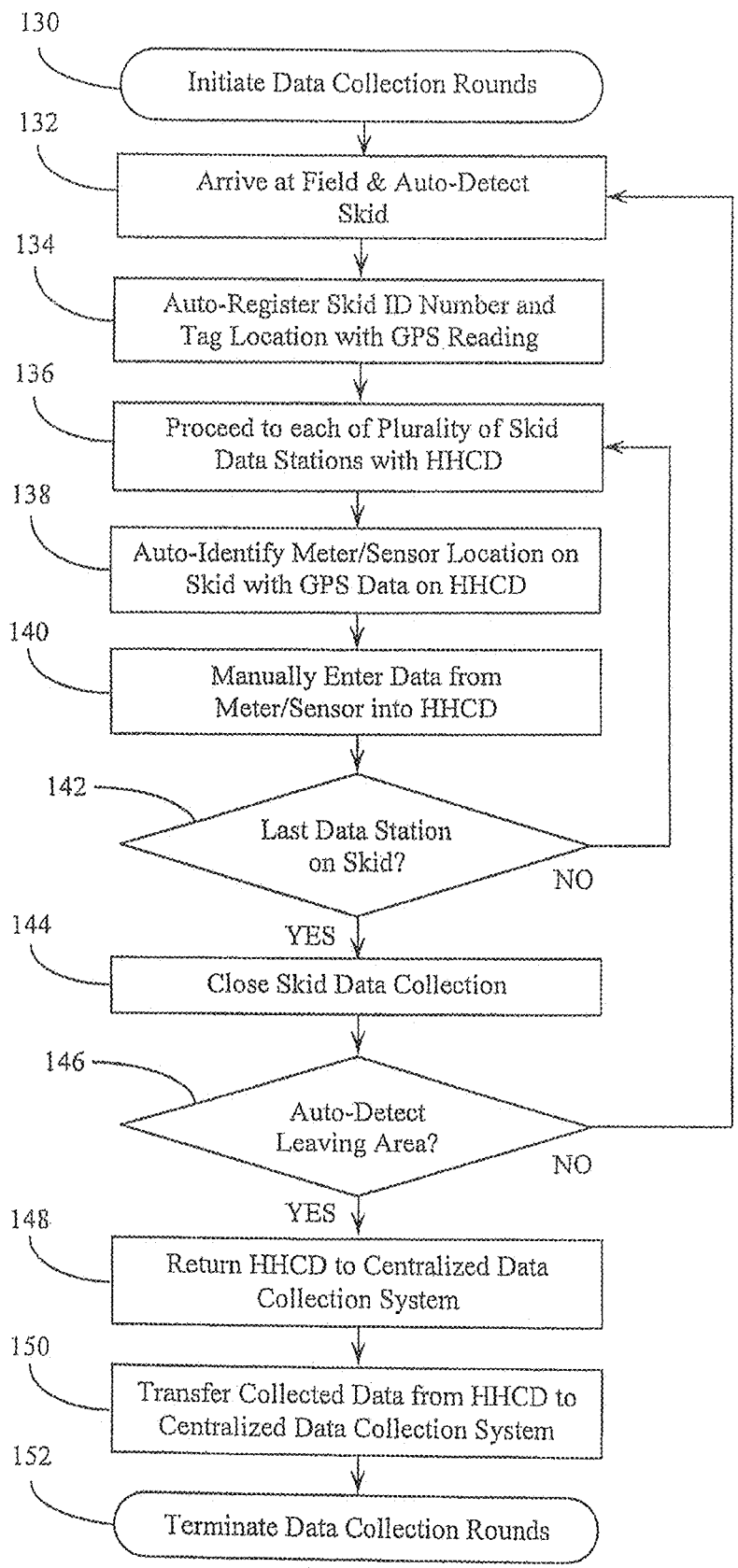
FIG. 8 is a flowchart of the process steps involved in the methodology for visually/manually collecting data from sensors and gauges on a skid, entering the data into the handheld computing device, and subsequently establishing a connection between the handheld computing device and a central office processor to transfer the data.

Reference is next made to FIGS. 6-8 for detailed descriptions of the various process steps associated with the transmission, reception, collection, and consolidation of the data from each of the individual gas well field collection areas. FIG. 6 is a flowchart of the process steps associated with the method for electronic data acquisition, including the short-range wired or wireless communication between data collection stations on the platform and the HOWARDACD, and the long-range communication between the HOWARDACD and the central office processor. These processes are initiated at Step 100, wherein daily (or some other periodicity) data collection rounds are begun. The monitoring personnel arrive at the skid at Step 102, wherein the presence of the HOWARDACD may be automatically detected by the instrumentation on the skid and/or the HOWARDACD may automatically detect the proximity of the skid. Step 104 involves the automatic registration of the skid ID (preferably by digital transmission) and/or the tagging identification of the location with a GPS coordinate reading. Auto registration may simply occur by recognizing a GPS reading and referencing a stored database wherein a particular skid is identified at a particular geographic location. Any of these mechanisms for "awakening" the HOWARDACD and alerting it to the skid to be interrogated may be implemented with the systems and methods of the present invention. A preferred embodiment includes an automatic electronic handshake between one or more wireless devices on the skid which prompts a GPS reading to uniquely identify the skid.

Step 106 involves the user proceeding to each of a plurality of skid data stations with the HOWARDACD. Step 108 involves the automatic identification of the station location on the skid, again based on wireless signal strength and according to proximity of the HOWARDACD to the station location, or alternatively corresponding with the GPS coordinate data associated with the position of the user holding the HOWARDACD in relation to the skid position, orientation, and configuration. Step 110 involves implementation of a handshake between the HOWARDACD and a data station that is being interrogated and Step 112 involves the actual communication of data between the data station and the HOWARDACD. Communication of this data is preferably through a short-range wireless communication system which utilizes radio frequency signals transmitted from the data station and received by the HOWARDACD.

Figure 9:
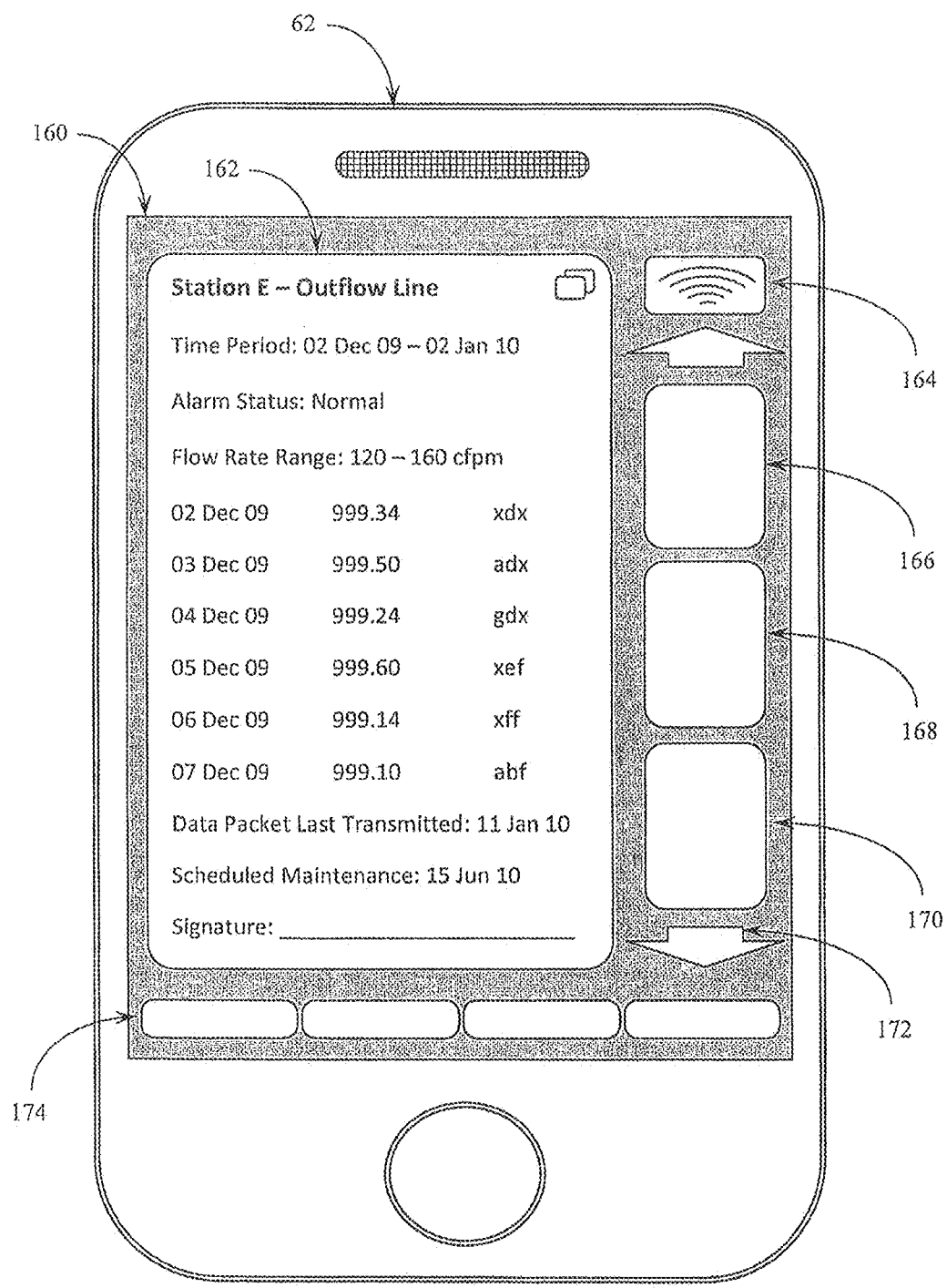
FIG. 9 illustrates a touch screen display which allows implementation of a graphical user interface.

An alternate subroutine associated with the method shown in FIG. 6 from Steps 106-112 is disclosed in FIG. 7 and involves implementation of a graphical user interface (see display screen in FIG. 9) that allows the monitoring personnel to step through the collection of data screens associated with the various instruments (e.g., gauges, meters, sensors, and other data generating devices) based upon the known configuration of a particular skid. Referencing this subroutine shown in FIG. 7, a first query is made to determine if station verification is required at query Step 108a. If not, the subroutine returns (Step 108b) to the automatic processing in FIG. 6. In this case, the data would be automatically allotted to the proper database location by way of the auto-selection identification. If station verification is required, then at Step 108c the HOWARDACD displays thumbnail images of data pages for various stations. The user then determines, at query Step 110a, whether manual selection of a particular station/data page is required. The HOWARDACD may preferably display thumbnail images of multiple stations/data pages on the skid and allow the user to manually select any of the individual stations in (or out of) sequence. A touch screen display (as shown in FIG. 9 for example) allows the user to simply select a particular station and have that data window enlarged to a point where data might easily be collected from that station. If manual selection of the station/data page is not required, the process skips to Step 110c wherein the appropriate data page is maximized for use. If manual selection is required, at Step 110b the user identifies and selects the station type or location to identify the appropriate data page to be used. Again, the user may sequentially step through each of the stations/data pages positioned on a skid and thereby ensure the collection of all relevant data from any particular location.

Subsequent to the above referenced selection routines (operable in the alternative) the station data may be communicated between the HOWARDACD and the data station at Step 112. Query Step 114 determines whether the last data station on the skid has been interrogated. If not, the process returns to Step 106 where each subsequent station is interrogated. If the last station on the skid has been interrogated, the process proceeds to Step 116 and the system closes the skid data collection. The process then proceeds, through one of the preferred methods described above, to allow the HOWARDACD to transmit the data package it has collected to the central office at Step 118. The system automatically queries whether or not the user has left the field through an auto detection process at Step 120. If not, then the overall process repeats itself for the next field location by returning to Step 102 where the user arrives at a skid. If the user chooses to leave the skid(s), the data collection process terminates at data collection termination Step 122.

Reference is next made to FIG. 8 which is a flowchart of the process steps involved in the methodology for visually/manually collecting data from sensors and gauges on a skid, entering the data into the HOWARDACD, and subsequently establishing a connection between the HOWARDACD and a central office processor to transfer the data. Once again, FIG. 8 represents a method of the present invention that is used where the variety of wireless sensors, gauges, meters, and controls are not available to the monitoring personnel on a particular skid. According to this method, the data collection rounds are initiated at Step 130 as before, where a gas production monitor and control equipment user arrives at a skid at Step 132. As the auto-detection of the location of a monitoring effort is coordinated with an external GPS system (not associated with the electronics or lack thereof on the skid) it is possible to utilize the skid's auto-identification methods of the present invention. Therefore, at Step 134 an identification of the skid ID number may be either input into the HOWARDACD manually and/or associated with the location based upon the GPS reading. Established databases would link a geographical location to a particular skid. As an alternative or an additional step, the user may enter the skid ID number into the HOWARDACD at Step 134.

The user, holding the HOWARDACD, proceeds at Step 136 to each of the plurality of skid data stations, visually observes the readings, and manually enters the data. The user at Step 138 identifies the specific meter/sensor location on the skid and preferably associates it with the GPS data on the HOWARDACD. The user then manually inputs data at Step 140 from the instrument into the HOWARDACD. It will be apparent that a subroutine process similar to that carried out with the method steps shown in FIG. 7, as an alternate process to an auto-identification process shown in FIG. 6, is also applicable to the manual data entry process shown in FIG. 8. In other words, the same application software that allows the user to manually step through various data screens reflecting various types of data stations can be used regardless of whether the data is collected manually, by visual inspection and manual data entry, or automatically, by wireless communication between the HOWARDACD and the instruments. In either case, data is input from an identified station at Step 140 as described above.

At query Step 142 a determination is made as to whether the last of the data stations on the skid has been interrogated. If not, the process returns to Step 136 and the collection of data continues. If the last data station on the skid has been interrogated, then at Step 144 the user closes the data collection and moves on to the next skid in the area. If the last skid has not been reached, based upon the auto-detection being made at query Step 146, the process again returns to Step 132 where a new skid is interrogated. Once the last skid in an area has been interrogated as determined at query Step 146, the process proceeds to Step 148 where the monitoring personnel return the HOWARDACD to the central office and connect it to the central processor. In one or more alternative embodiments, the user may (as described above) return the HOWARDACD to a location within range of the inspection vehicle's short-range communication system. In either case, Step 150 involves downloading the collected data from the HOWARDACD to either the central processor at the home office or to the data receiving (or data receiving and retransmitting) system of the user's vehicle. The manual data collection process then concludes at Step 152 wherein the data collection rounds are terminated.

Reference is made to FIG. 9, which provides a screen shot of a typical graphical user interface (GUI) associated with HOWARDACD 62 and used by gas production monitor and control equipment personnel implementing the systems and methods of the present invention. HOWARDACD 62 provides (by way of application software) a screen display 160 that includes one or more thumbnail images 166, 168, & 170 in the form of touch screen buttons that step the user through each of the known or identified stations on a particular skid. The display presents the user with an enlarged window view 162 of the data collection form for a particular station that the HOWARDACD is near or for an instrument or station which the user has selected. This image is maximized to allow the user to input data or to automatically collect it from the station as described above.

In one or more embodiments, the next thumbnail data page in line may be selected by the user by touching the touch screen on the appropriate thumbnail 166, 168, or 170 to enlarge to the data collection screen and allow the user to maximize the screen and input data therein. Additional individual stations may be selected by arrow buttons 172 which scroll the user through the various station pages or station type pages. Additional functions on the specific screen display shown may display all stations on the skid and allow the user to manually select the various stations or allow the user to have the HOWARDACD identify the nearest data station based upon the user's proximity to the station. Standard menus 174 may be provided for entering data and collecting the information either manually, using the manual input means, or automatically, via wireless communications between the HOWARDACD and the instruments. The user may be alerted to the transmission/reception of data through an icon 164 positioned on the display 160. A similar GUI may be implemented on the specialized HOWARDACD shown and described with the system in FIG. 5. Additional components to the data collection software system to implement the various functions and steps of the methods of the present invention should be apparent to those skilled in the art of data collection, database storage, and data communication.

Figure 10:
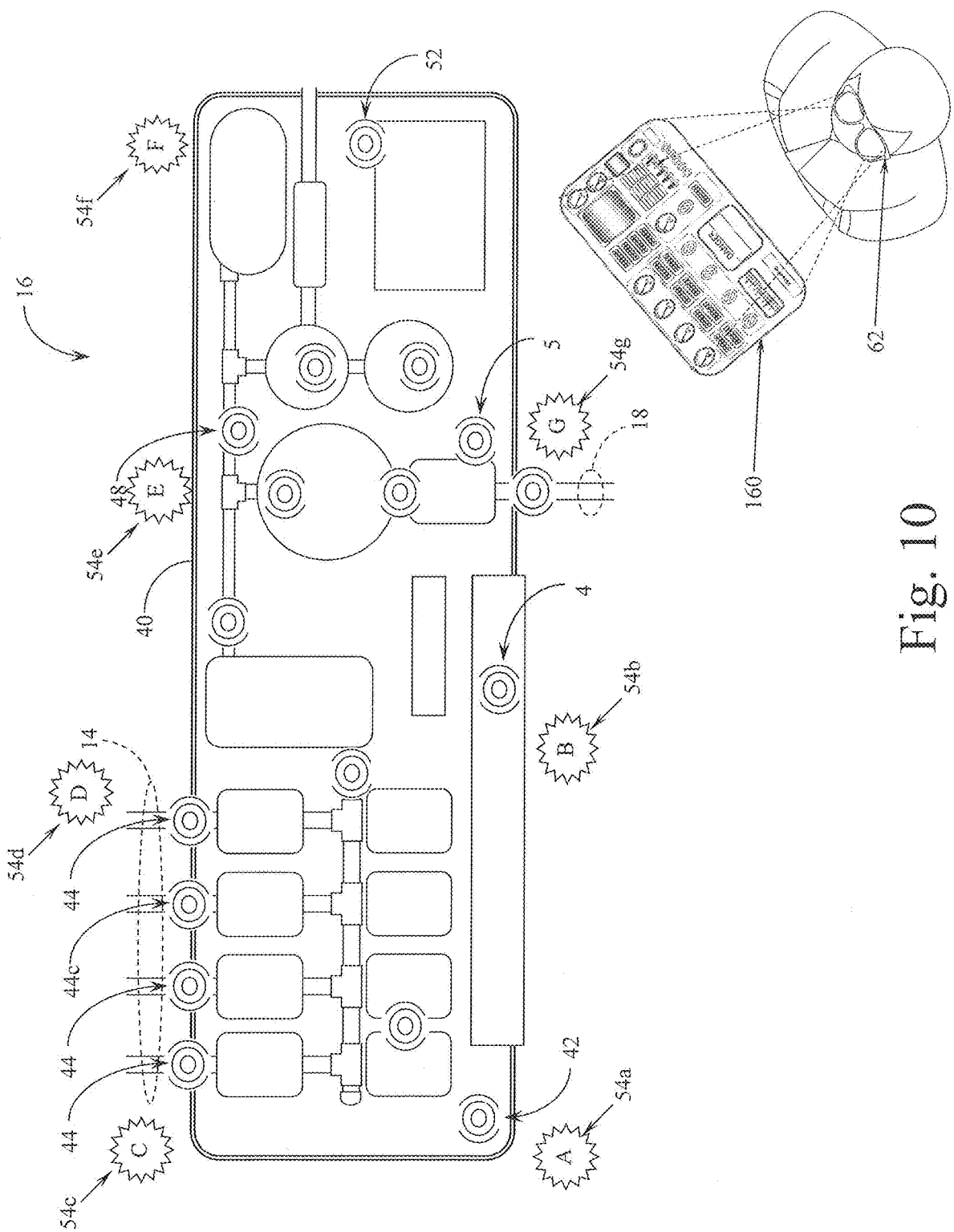
FIG. 10 is a top plan view of a typical gas field platform/skid 16 and illustrates an augmented reality glasses control display.

Reference is made to FIG. 10, which provides the top plan view of a typical gas field platform from FIG. 2a, along with the depiction of the reader of a typical ARUI associated with HOWARDACD 62 and used by gas production monitor and control equipment personnel implementing the systems and methods of the present invention. In FIG. 10, the reader wears augmented reality glasses, which functions as the HOWARDACD 62, and superimposes a virtual version of display 160 into the field of view of the reader as the reader approaches various positions pertaining to the various instruments on the skid. For instance, if the user is standing at position D (54d), the HOWARDACD 62 will display information pertaining to 44d since this instrument, in accordance with its connection with remote transceiver 36, is the closest to position D. Alternatively, at the same location (position D), the HOWARDACD may allow the user to select information pertaining to any of instruments

44a-44d within view of the HOWARDACD 62. The virtual version of display 160 includes controls that can be activated by the HOWARDACD 62 using the controls described for FIG. 9, but in this case detected by the virtualization and augmented reality control schemes of the HOWARDACD 62. In some embodiments the HOWARDACD 62 will highlight the e various instruments with different colors. When the ARUI receives and records data from the particular instrument, the color changes or the instrument highlight is shaded in to indicate that the HOWARDACD 62 has recorded the data. In another embodiment, the HOWARDACD displays the instrument readings and or control panel automatically to the reader when glancing or looking at the particular instrument section of the skid.

Figure 11:
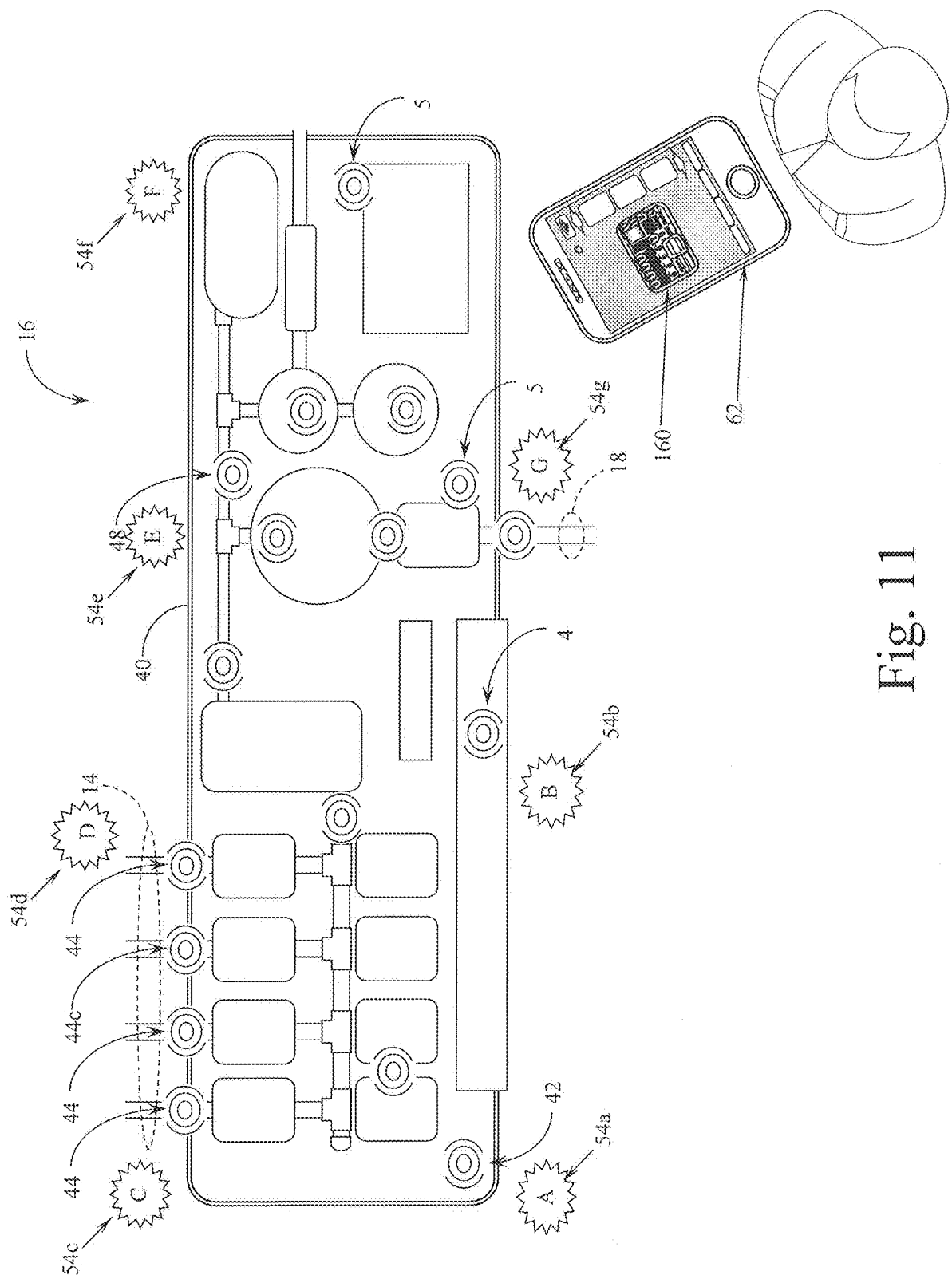
FIG. 11 is a top plan view of a typical gas field platform/skid 16 and illustrates an augmented reality handheld device control display.

Reference is made to FIG. 11, which provides the top plan view of a typical gas field platform from FIG. 2a, along with the depiction of the reader of a typical ARUI associated with HOWARDACD 62 and used by gas production monitor and control equipment personnel implementing the systems and methods of the present invention. In FIG. 10, the reader uses a handheld device which functions as the HOWARDACD 62, and superimposes a virtual version of display 160 into the display of the HOWARDACD 62 reader approaches various positions pertaining to the various instruments on the skid by using the camera of the HOWARDACD 62. For instance, if the user is standing at position D (54d), the HOWARDACD 62 will display information pertaining to 44d since this instrument, in accordance with its connection with remote transceiver 36, is the closest to position D. Alternatively, at the same location (position D), the HOWARDACD may allow the user to select information pertaining to any of instruments 44a-44d within view of the HOWARDACD 62 as the reader directs the HOWARDACD 62. The virtual version of display 160 includes controls that can be activated by the HOWARDACD 62 using the controls described for FIG. 9, but in this case detected by the virtualization and augmented reality control schemes of the HOWARDACD 62. In some embodiments the HOWARDACD 62 will highlight the various instruments with different colors. When the ARUI receives and records data from the particular instrument, the color changes or the instrument highlight is shaded in to indicate that the HOWARDACD 62 has recorded the data. In another embodiment, the HOWARDACD 62 displays the instrument readings and or control panel automatically to the reader when glancing or looking at the particular instrument section of the skid.

Figure 12:
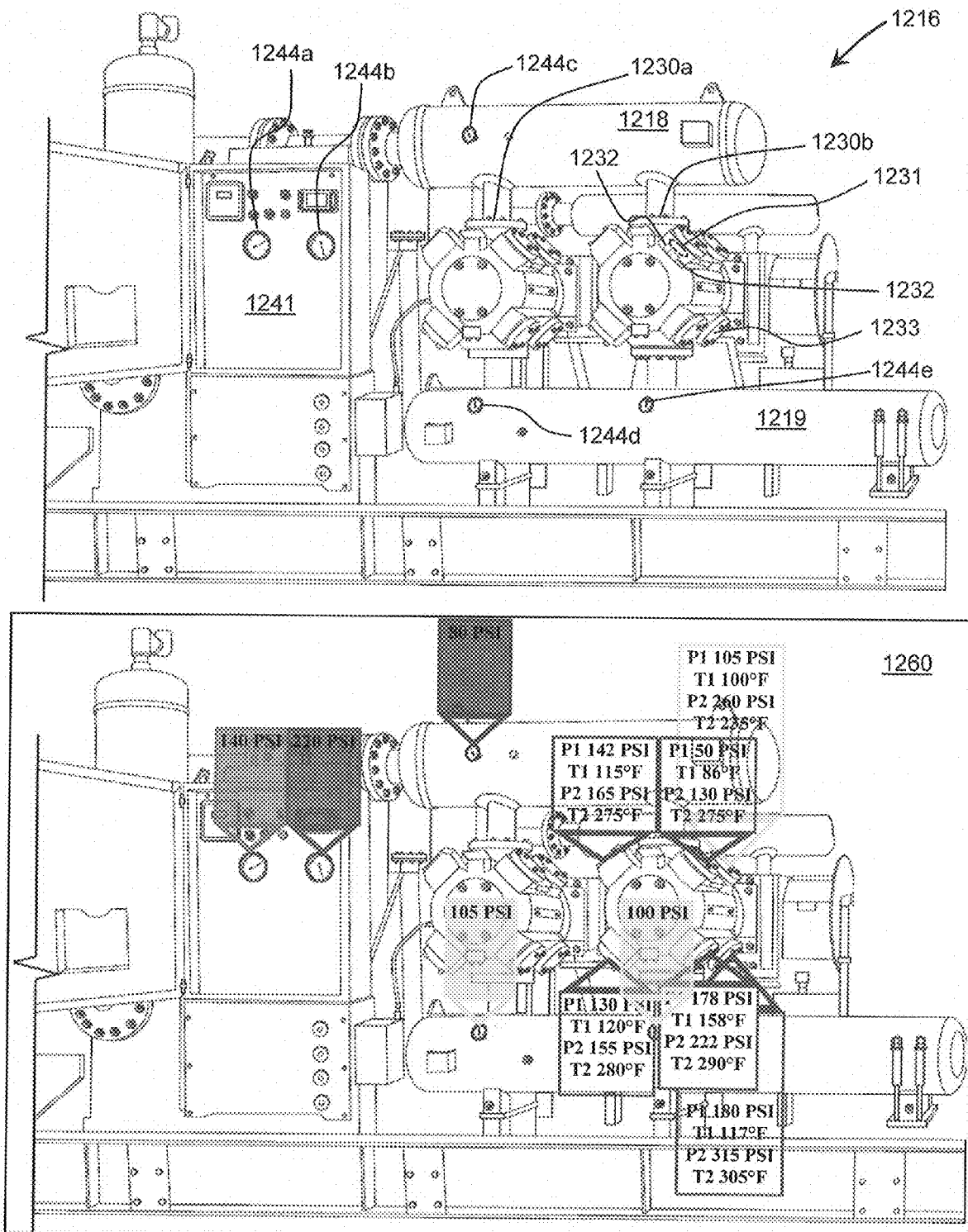
FIG. 12 is a top plan view of a typical gas field platform skid 1216 along with a view of the platform/skid 1216 as it would appear when using an augmented reality handheld device control display.

Turning now to FIG. 12, there is shown a plan view of another example of a gas field platform/skid 1216 at the top, and below that is a view of the same skid 116; however, the bottom representation is the view as seen on a display of the HOWARDACD 62. Particularly, there is shown one non-limiting example of the display 1260 characteristics produced by the ARUI that indicate the readings on each of the instruments 1244a-1244e located at various positions on the skid 1216.

As illustrated, skid 1216 includes a control panel 1241 shown as having two instruments 1244a, 1244b for recording conditions such as pressure and temperature. It should be understood that this is one non-limiting example of a control panel 1241, which may incorporate fewer or more instruments. Also shown on skid 1216 are two gas compressors 1230a, 1230b, wherein each compressor 1230a, 1230b has a plurality of valves 1231 positioned within a plurality of valve covers 1233 positioned on compressors 1230. Although not particularly shown in FIG. 12, it should be understood that within each of the valve covers 1233, there is located a valve 1231. Associated with each valve 1231 is one or more sensors 1232 for measuring temperature and/or pressure conditions at the valve 1230. Particularly, the sensor(s) 1232 at each valve 1231 may measure and monitor suction and discharge pressures as well as suction and discharge temperatures, all in real time.

Furthermore, associated with compressors 1230a, 1230b are two pressure vessels, particularly pulsation bottles 1218, 1219. Pulsation bottle 1218 is shown to incorporate one associated instrument 1244c, in this case a pressure gauge. Pulsation bottle 1219 is shown as having two pressure gauges 1244d and 1244e. Each of these pressure gauges 1244c-1244e provide real-time pressure readings to HOWARDACD 62.

When an instrument reads a value that is within an acceptable and safe operating range, the display 1260 shows the instrument reading color-coded in green above or below that particular instrument, such that one vertex of a triangle points to the particular instrument. As the reading on a particular instrument approaches a value outside of the acceptable range for the particular instrument, the color shown in the display 1260 will change. When the reading is just outside an acceptable and safe range, the reading indicator may be yellow. Any reading that is outside an acceptable range and is also approaching, but just outside of, an unsafe range may be shown in orange on the display 1260. Once an instrument indicates an unsafe and potentially dangerous reading, the display 1260 may show the reading above the instrument being red in color.

The color coding related to the condition of the system as measured by the instruments is instructive for a reader tasked with reading and/or recording the instrument readings. When an instrument reading is outside of an established and acceptable range, the reader can see instantly what color is shown in the display. The color-coded display of instrument readings instantly indicates the condition of the system to a user reading the instruments. As previously described, when an instrument's real-time reading has been read and recorded, the reading display is fully colored in, such as those readings shown for instruments 1244a-1244e. For those instruments whose readings have not yet been recorded, the reading is still shown as a color-coded instrument reading display. However, the reading display is not filled in with color but only has an outline that is color-coded indicating whether the reading for that particular instrument is within or outside of an acceptable range, such as those readings shown for the valves 1231 located within compressor 1230b on the right side of skid 1216. Although instrument/sensor readings are not shown with respect to compressor 1230a shown in FIG. 12, it should be understood that, during normal operations, the display 1260 would also show readings from the valves associated with this compressor 1230a.

In addition to the color indicators, in some embodiments, the display may further show an actual reading as detected by the instrument. As shown in FIG. 12, this may be a numerical value, such as a pressure reading on a pressure gauge, a temperature reading on a temperature gauge, a flowrate on a flow meter, etc. This displayed reading is shown above the instrument from which the reading is taken. It should be understood that the instrument reading values shown in FIG. 12 are merely examples for the purposes of showing the appearance of the display. Alternatively, the display may reproduce a digital rendering of the actual physical appearance of the particular instrument clearly indicating the real-time measurement which can be read quickly at a glance by a reader and recorded.

This written description enables one of ordinary skill in the art to make and use what is presently considered to be the best mode thereof. Further, one of ordinary skill in the art will understand and appreciate the existence of many (but not all) variations, combinations, and equivalents of the specific embodiments, methods, and examples herein. The invention should therefore not be limited by the above described embodiments, methods, and examples, but by all embodiments and methods within the scope and spirit of the invention as claimed. It is intended instead that any claims with this application, or any claims that may be added or amended, be interpreted to embrace all further modifications, changes, rearrangements, substitutions, alternatives, design choices, and embodiments that may be evident to one of ordinary skill in the art.

Although one or more of the foregoing embodiments is the most preferred at present, those of ordinary skill in the art will recognize many possible alternatives. For example, one may appreciate that the systems and methods of the present invention include monitoring and controlling fluid hydrocarbon production, including natural gas and its related components and associated fluids, whether the fields and skids are located onshore, offshore, or any combination thereof. Similarly, the handheld computing device (HOWARDACD) includes computing devices that are not necessarily held in the user's hand, but are rather worn in a headset, embedded in clothing, attached to a remotely piloted vehicle or craft, or in some other configuration of computation and communication capabilities. Likewise, one of ordinary skill in the art can appreciate that the present invention's means for determining geographical position, such as a global navigation satellite system, includes other position fixing means such as visual bearings from landmarks with known positions, range and bearing from geodetic survey markers, or other geographic position fixing means. One may also appreciate that the short- and long-range communication systems of the present invention include systems using unencrypted communications, encrypted communications, or one or more combinations thereof. Further, regarding a centralized data collection computer system, one of ordinary skill in the art can appreciate that the data aggregating and analyzing functions may be distributed across several different data processors, including such implementations as cloud computing systems, and that the centralized data collection computer system is not limited to a single physical device. In any case, all substantially equivalent systems, articles, and methods should be considered within the scope of the present invention.

We claim:

1. A system for processing information from instruments associated with hydrocarbon processing equipment, the system comprising:
   a) a computing system comprising:
      1) a computing device with a data processor;
      2) an operating system;
      3) a display device; and
      4) a camera;
   b) a plurality of wireless transceivers, wherein each wireless transceiver is linked with one or more of the instruments associated with the hydrocarbon processing equipment, each wireless transceiver being configured to transmit a data signal, wherein:
      1) the data signal includes an identification of the one or more instruments with which the wireless transceiver is linked, and the data signal further includes operational data recorded by the one or more instruments; and
      2) the computing device is configured to receive the data signal, and the data signal received from each of the wireless transceivers enables the computing device to detect and identify each of the instruments;
   c) the computing system being further configured to superimpose a virtual representation, on the display, of recorded operational data received by the computing device, wherein the virtual representation is presented into a field of view of a user, wherein the field of view includes an actual view of the instruments associated with the hydrocarbon processing equipment; and
   d) the computing system being further configured to:
      1) compare the recorded operational data received from the one or more instruments to norm data indicative of normal equipment operating condition limits; and
      2) provide an alert when the recorded operational data received from the one or more instruments differs from the norm data.

2. The system as in claim 1, further comprising a short-range wireless communication system.

3. The system as in claim 2, wherein the data signal from the wireless transceiver is transmitted via the short-range wireless communication system.

4. The system as in claim 3, wherein the short-range wireless communication system includes communicating via a radio frequency (RF) signal, and a strength of the RF signal is related to a proximity of the computing device to the wireless transceiver transmitting the RF signal, wherein the RF signal is stronger when the computing device is closer to the wireless transceiver transmitting the RF signal.

5. The system as in claim 1, wherein the alert comprises a color coding, wherein the computing device is configured to superimpose the color coding in the field of view on the display.

6. The system as in claim 1, wherein the computing device is in communication with a centralized data collection computer system via at least one of a short-range wired communication system, a short-range wireless communication system, or a long-range wireless communication system.

7. The system as in claim 5, wherein the computing device is configured to transmit the recorded operational data to the centralized data collection computer system.

8. The system as in claim 1, wherein the instruments are located on a natural gas platform skid, and the hydrocarbon processing equipment is for natural gas processing.

9. The system as in claim 1, wherein the data signal transmitted by each of the wireless transceivers enables simultaneous detection and identification of each instrument by the computing device.

10. The system as in claim 1, wherein the instruments are on a natural gas platform skid.

11. The system as in claim 1, wherein the computing device comprises an augmented reality device.

12. A system for processing information from instruments associated with hydrocarbon processing equipment, the system comprising:
   a) an augmented reality computing device comprising:
      1) a data processor
      2) an operating system;
      3) a display device; and
      4) a camera;
   b) a short-range wireless communication system including a plurality of wireless transceivers, each wireless transceiver being linked to one of the instruments;
   c) wherein each wireless transceiver is configured to transmit a data signal via the short-range wireless communication system, wherein the data signal includes an identification of the instrument with which the wireless transceiver is linked, and the data signal further includes operational data recorded by the instrument;

d) the augmented reality computing device being configured to receive the data signal from each of the wireless transceivers enabling the augmented reality computing device to identify the instrument linked to each wireless transceiver and to further receive the operational data recorded by each instrument;
e) the augmented reality computing device being further configured to superimpose, on the display, a virtual representation of the operational data received from each wireless transceiver, the virtual representation being superimposed into a field of view of a user of the augmented reality computing device, wherein the field of view includes an actual view of the instruments; and
f) the augmented reality computing device being further configured to:
1) compare the received operational data to norm data that is indicative of normal equipment operating condition limits; and
2) provide an alert when the operational data received differs from the norm data.

13. The system as in claim 11, wherein the data signal from the wireless transceiver is transmitted via a radio frequency (RF) signal.

14. The system as in claim 12, wherein a strength of the RF signal is related to a proximity of the computing device to the wireless transceiver transmitting the RF signal, wherein the RF signal is stronger when the computing device is closer to the wireless transceiver transmitting the RF signal.

15. The system as in claim 12, wherein the alert comprises a color coding, wherein the computing device is configured to superimpose the color coding in the field of view on the display.

16. The system as in claim 12, wherein the data signal transmitted by each of the wireless transceivers enables simultaneous detection and identification of each instrument by the computing device.

17. The system as in claim 12, further comprising a centralized data collection system, said augmented reality computing device being in communication with the centralized data collection system via a long-range communication system, wherein the augmented reality computing device is configured to transmit the received operational data to the centralized data collection system.

18. The system as in claim 12, wherein each of the instruments is one of a gauge, including temperature gauge or a pressure gauge; a meter, including a flow meter; a sensor; a monitor; a controller; a data-aggregating device; a data station; or a control panel.

19. The system as in claim 18, wherein each of the instruments is configured to be wirelessly enabled.

20. A system for processing information from instruments associated with hydrocarbon processing equipment, the system comprising:
a) an augmented reality computing device comprising:
1) a data processor
2) an operating system;
3) a display device; and
4) a camera;
b) a short-range wireless communication system including a plurality of wireless transceivers, each wireless transceiver being linked to one of the instruments;
c) a centralized data collection system, wherein the augmented reality computing device is in communication with the centralized data collection system via a long-range communication system, and the augmented reality computing device is configured to transmit the received operational data to the centralized data collection system;
d) wherein each wireless transceiver is configured and configured to transmit a data signal via the short-range wireless communication system, wherein the data signal includes an identification of the instrument with which the wireless transceiver is linked, and the data signal further includes operational data recorded by the instrument;
e) the augmented reality computing device being configured to receive the data signal from each of the wireless transceivers enabling the augmented reality computing device to identify the instrument linked to each remote transceiver and to further receive the operational data recorded by each instrument;
f) the augmented reality computing device being further configured to superimpose, on the display, a virtual representation of the operational data received from each remote transceiver, the virtual representation being superimposed into a field of view of a user of the augmented reality computing device, wherein the field of view includes an actual view of the instruments;
g) the augmented reality computing device being further configured to:
1) compare the received operational data to norm data that is indicative of normal equipment operating condition limits; and
2) provide an alert when the operational data received differs from the norm data, wherein the alert comprises a color coding, and the augmented reality computing device is configured to superimpose the color coding in the field of view on the display;
h) wherein the data signal from the wireless transceiver is transmitted via a radio frequency (RF) signal, and wherein a strength of the RF signal is related to a proximity of the augmented reality computing device to the wireless transceiver transmitting the RF signal, wherein the strength of the RF signal is stronger the closer the augmented reality computing device is to the wireless transceiver transmitting the RF signal; and
i) wherein the data signal transmitted by each of the wireless transceivers enables simultaneous detection and identification of each instrument by the augmented reality computing device.

\* \* \* \* \*